US007885214B2

(12) United States Patent
Ahmadi et al.

(10) Patent No.: US 7,885,214 B2
(45) Date of Patent: Feb. 8, 2011

(54) DEVICE, SYSTEM, AND METHOD FOR PARTITIONING AND FRAMING COMMUNICATION SIGNALS IN BROADBAND WIRELESS ACCESS NETWORKS

(75) Inventors: Sassan Ahmadi, Portland, OR (US); Hujun Yin, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 405 days.

(21) Appl. No.: 11/907,808

(22) Filed: Oct. 17, 2007

(65) Prior Publication Data

US 2008/0095195 A1    Apr. 24, 2008

Related U.S. Application Data

(60) Provisional application No. 60/852,891, filed on Oct. 17, 2006.

(51) Int. Cl.
*H04J 3/24* (2006.01)
*H04J 1/10* (2006.01)

(52) U.S. Cl. ............... 370/295; 370/343; 370/468; 370/471; 370/473

(58) Field of Classification Search ............... None
See application file for complete search history.

(56) References Cited

U.S. PATENT DOCUMENTS

| 6,278,696 | B1 | 8/2001 | Feldman et al. | |
|---|---|---|---|---|
| 6,907,020 | B2 | 6/2005 | Periyalwar et al. | |
| 6,999,446 | B2 * | 2/2006 | Hall et al. | ............... 370/349 |

(Continued)

FOREIGN PATENT DOCUMENTS

KR    2003-0030901 A    4/2003

OTHER PUBLICATIONS

International Search Report and Written Opinion of Application PCT/US2007/081686 filed Oct. 17, 2007. Date mailed Mar. 18, 2008.
Presentation of IEEE 802.20 Working Group on Mobile Broadband Wireless Access, Nov. 2005.

(Continued)

*Primary Examiner*—Seema S Rao
*Assistant Examiner*—Samina Choudhry
(74) *Attorney, Agent, or Firm*—Shiloh et al.

(57) ABSTRACT

A method and system for partitioning frames into sub-frames, where the frames may be defined according to a reference system standard, and transmitting one or more sub-frames during a pre-designated downlink transmission, and transmitting one or more sub-frames during a pre-designated uplink transmission. A method and system for partitioning frames into sub-frames, transmitting one or more sub-frames including a legacy preamble for communicating with a legacy terminal operating according to a reference system standard during a pre-designated legacy transmission period, and transmitting sub-frames including a supplemental preamble for communicating with a non-legacy terminal operating according to the evolved version of the reference system standard during a pre-designated non-legacy transmission period. A method and system for partitioning each of two or more frames into two or more sub-frames and transmitting the sub-frames for a non-relay transmission including transmitting a (DL:BS→MS/RS) sub-frame during a pre-designated downlink transmission and a (UL:MS/RS→BS) sub-frame during a pre-designated uplink transmission, and transmitting sub-frames for a relay transmission including transmitting a (DL:RS→MS) sub-frame during a pre-designated downlink transmission and a (UL:MS→RS) sub-frame during a pre-designated uplink transmission.

24 Claims, 26 Drawing Sheets

U.S. PATENT DOCUMENTS

| | | | | |
|---|---|---|---|---|
| 7,496,113 | B2* | 2/2009 | Cai et al. | 370/474 |
| 2003/0087603 | A1 | 5/2003 | Li et al. | |
| 2007/0073805 | A1* | 3/2007 | Jorgensen | 709/203 |
| 2007/0217353 | A1* | 9/2007 | Asa et al. | 370/315 |
| 2008/0039107 | A1* | 2/2008 | Ma et al. | 455/450 |

OTHER PUBLICATIONS $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Sep. 2007.

* cited by examiner

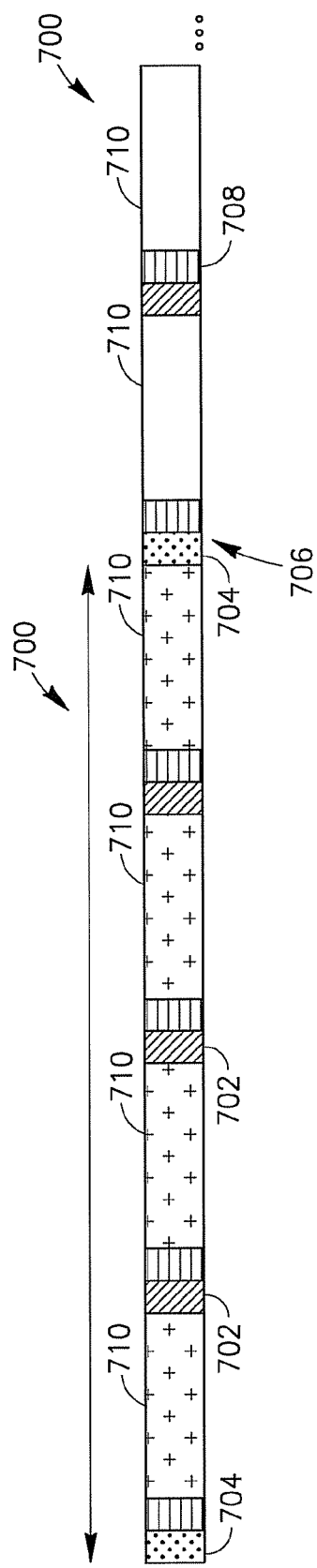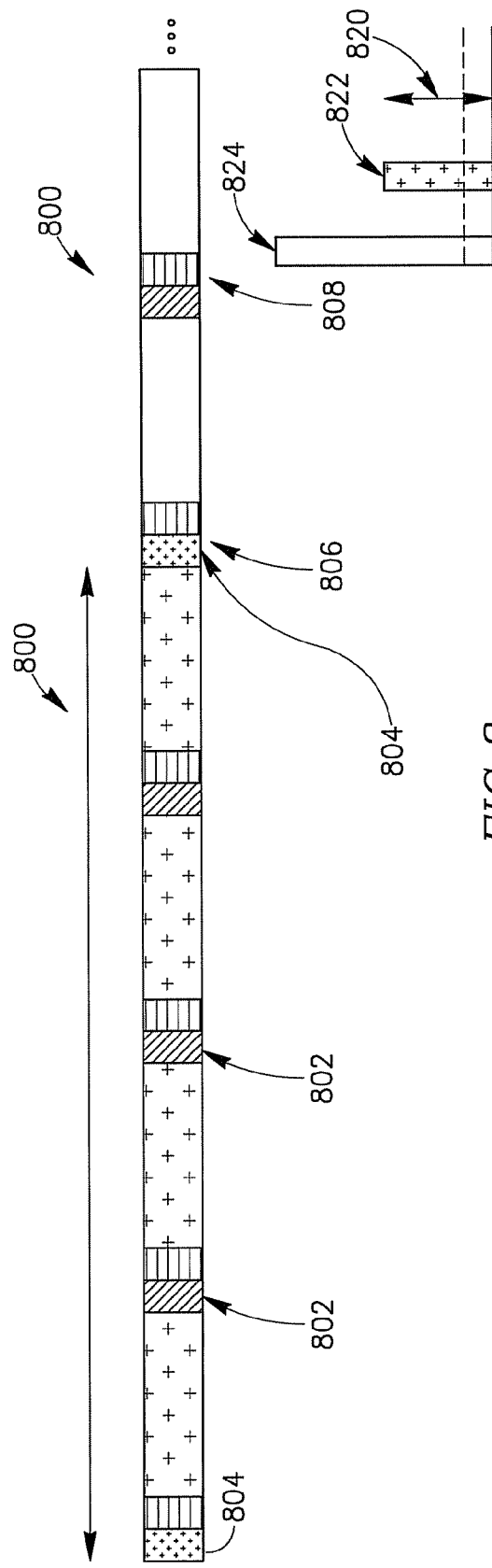

DEVICE, SYSTEM, AND METHOD FOR PARTITIONING AND FRAMING COMMUNICATION SIGNALS IN BROADBAND WIRELESS ACCESS NETWORKS

PRIOR APPLICATION DATA

The present application claims priority from U.S. provisional application No. 60/852,891, filed on Oct. 17, 2006, which is incorporated by reference in its entirety.

BACKGROUND OF THE INVENTION

Due to increasing demand for broadband communications, high speed telecommunication services such as wireless mediums, which may be relatively inexpensive as compared to existing cable and land line technologies, may be provided to subscribers. Accordingly, it may be desirable to improve efficiency and/or capacity of broadband wireless communication systems.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 7 is a schematic illustration of a super-frame structure having a supplemental preamble multiplexed with a legacy preamble according to an embodiment of the present invention;

FIG. 8 is a schematic illustration of a super-frame structure having a supplemental preamble multiplexed with a legacy preamble, where the legacy preamble may be obscured from legacy terminals, according to an embodiment of the present invention;

Figure 1:
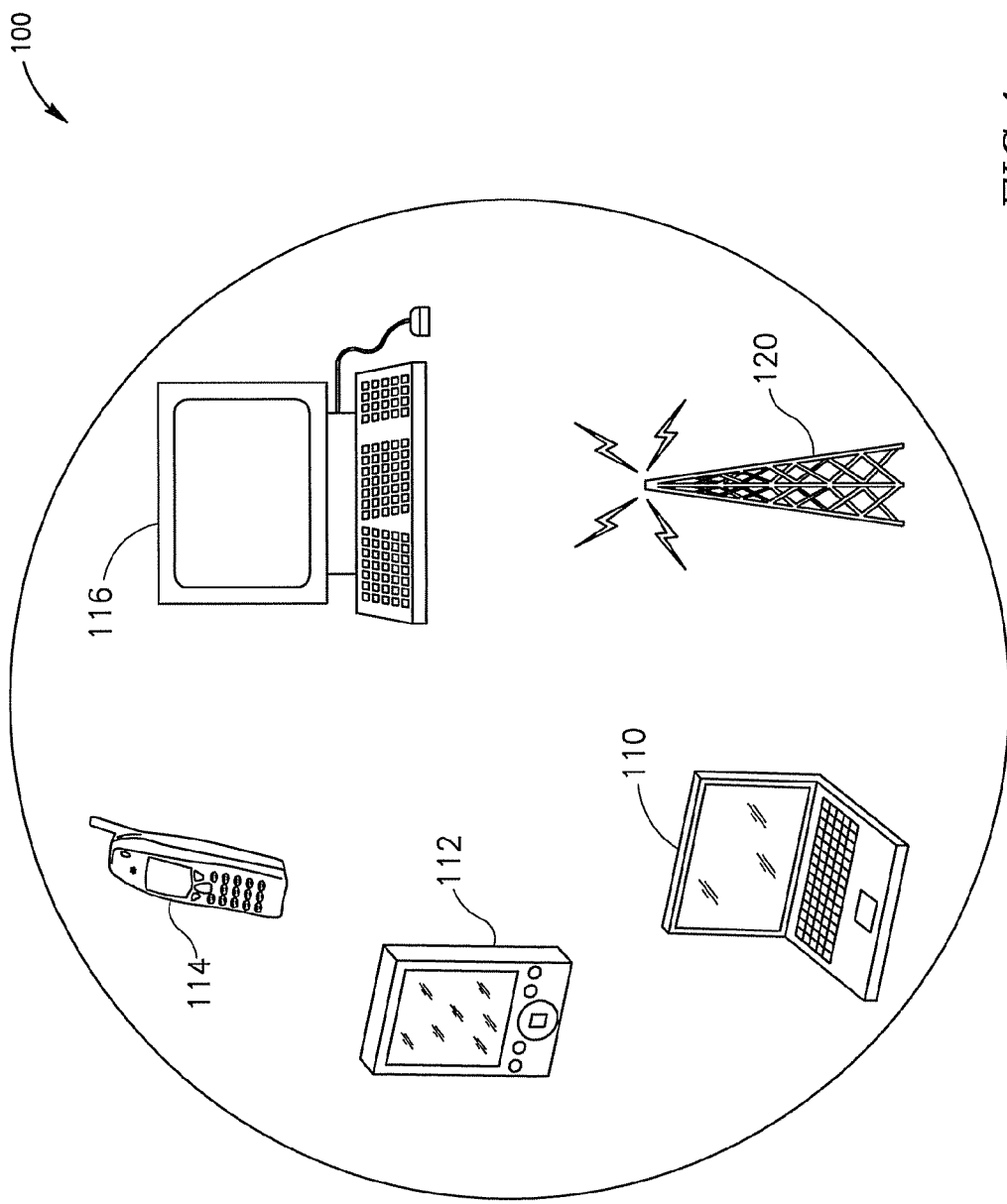
FIG. 1 is a schematic illustration of a wireless network according to an embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

While the following detailed description may describe various embodiments of the present invention in relation to wireless networks utilizing orthogonal frequency division multiplexing (OFDM) modulation, the embodiments of present invention are not limited thereto and, for example, may be implemented using other modulation and/or coding schemes where suitably applicable. Further, while example embodiments are described herein in relation to wireless metropolitan area networks (WMANs), the invention is not limited thereto and can be applied to other types of wireless networks where similar advantages may be obtained. Such networks specifically include, but are not limited to, wireless local area networks (WLANs), wireless personal area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, mobile stations, base stations, access points (APs), gateways, bridges, hubs and cellular radiotelephones. Further, the radio systems within the scope of the invention may include cellular radiotelephone systems, satellite systems, personal communication systems (PCS), two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

Reference is made to FIG. 1, which schematically illustrates a wireless network 100 according to an embodiment of the present invention. Wireless network 100 may include provider network (PN) 120, a base station (BS) 118, and one or more subscriber or other stations 110, 112, 114, and/or 116, which may be for example mobile or fixed subscriber stations. In some embodiments, base station 118, for example, in WLANs, may be referred to as an access point (AP), terminal, and/or node, and subscriber stations 110, 112, 114, and/or 116 may be referred to as a station (STA), terminal, and/or node. However, the terms base station and subscriber station are used merely as an example throughout this specification and their denotation in this respect is in no way intended to limit the inventive embodiments to any particular type of network or protocols.

Wireless network 100 may facilitate wireless access between each of subscriber stations 110, 112, 114, and/or 116 and PN 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Cor1-2001; IEEE 802.11g™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.16-2004/Cor1-2005 or IEEE 802.16e-2005, which may herein be referred to as the "IEEE 802.16e-2005" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™)", Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a $3^{rd}$ Generation Partnership Project (3GPP) Long Term Evolution (LTE) cellular network or any protocols for WPANs or WWANs.

Embodiments of the invention may enable the next generation of mobile WiMAX systems (e.g., based on IEEE 802.16m standard) to efficiently support substantially high mobility and low latency applications, such as, for example, Voice-over-Internet Protocol (VoIP), interactive gaming over the air-interface, and/or "multi-hop" relay operations, while enabling backward compatible operations and integration with reference standards (e.g., the legacy mobile WiMAX systems based on IEEE 802.16e-2005 standard).

In some embodiments, base station 118 may manage and/or control wireless communications among subscriber stations 110, 112, 114, and/or 116 and between subscriber stations 110, 112, 114, and/or 116 and provider network 120. Subscriber stations 110, 112, 114, and/or 116 may, in turn, facilitate various service connections of other devices (not shown) to wireless network 100 via a private or public local area network (LAN), although the embodiments are not limited in this respect.

Figure 2:
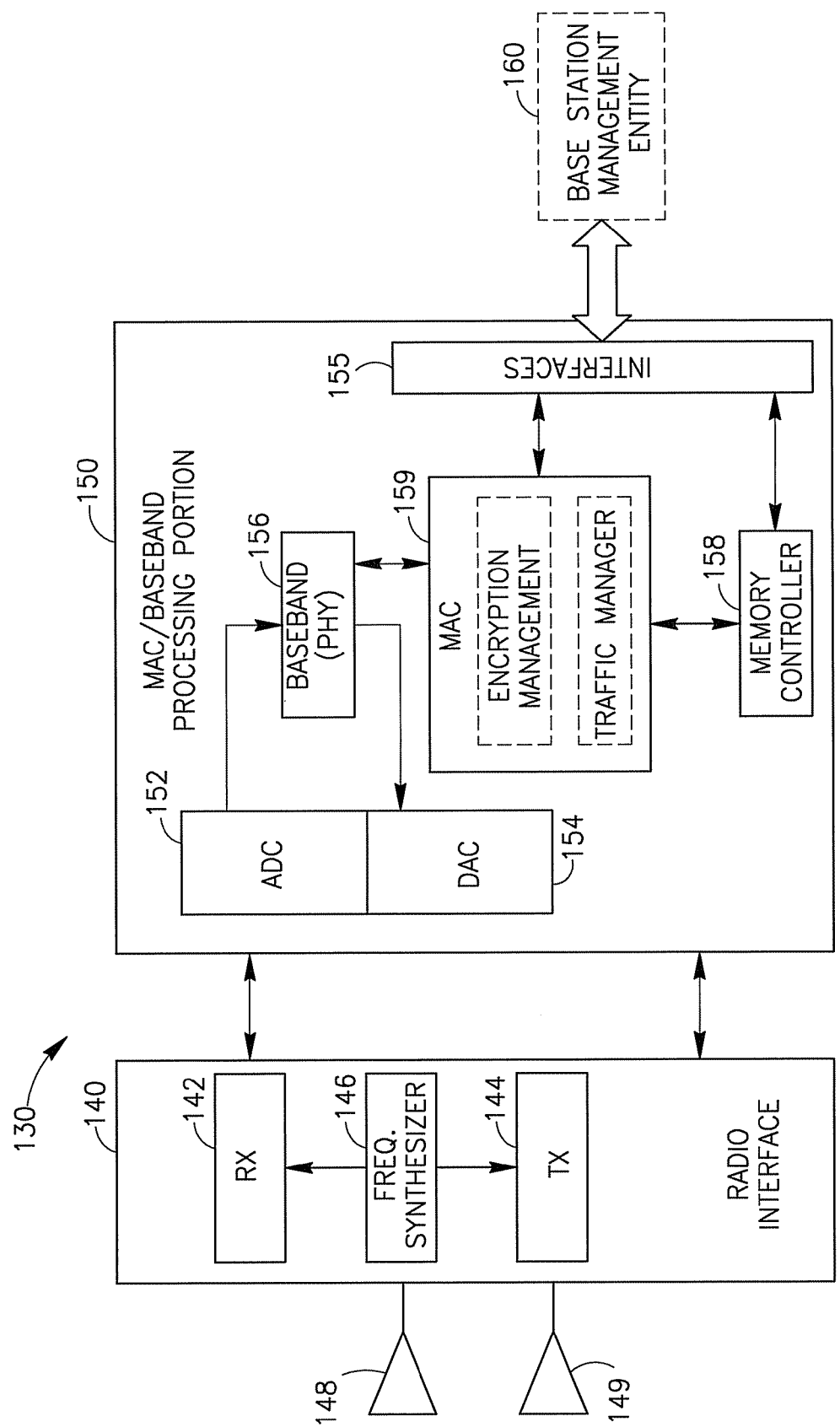
FIG. 2 is a schematic illustration of an apparatus for use in a wireless network according to an embodiment of the present invention.

Reference is made to FIG. 2, which schematically illustrates an apparatus 130 for use in a wireless network according to an embodiment of the invention. For example, apparatus 130 may be a terminal, device, or node (e.g., one of subscriber stations 110, 112, 114, and/or 116, base station 118, and/or provider network 120, described in FIG. 1) for communicating with other terminals, devices, or nodes, in a wireless network (e.g., wireless network 100, described in FIG. 1). Apparatus 130 may include a controller or processing circuit 150 including logic (e.g., including hard circuitry, processor and software, or a combination thereof) to determine the false frame detection rate and/or adjust the sensitivity of frame detection as described in one or more embodiments of the invention. In some embodiments, apparatus 130 may include a radio frequency (RF) interface 140 and/or a medium access controller (MAC)/baseband processor circuit 150.

In one embodiment, RF interface 140 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. RF interface 140 may include, for example, a receiver 142, a transmitter 144 and/or a frequency synthesizer 146. Interface 140 may include bias controls, a crystal oscillator and/or one or more antennas 148 and/or 149. In another embodiment, RF interface 140 may use external voltage-controlled oscillators (VCOs), surface acoustic wave filters, intermediate frequency (IF) filters and/or RF filters, as desired. Due to the variety of potential RF interface designs an expansive description thereof is omitted.

Processing circuit 150 may communicate with RF interface 140 to process receive and/or transmit signals and may include, for example, an analog-to-digital converter 152 for down converting received signals, a digital-to-analog converter 154 for up converting signals for transmission. Further, processor circuit 150 may include a baseband or physical layer (PHY) processing circuit 156 for PHY link layer processing of respective receive/transmit signals. Processing circuit 150 may include, for example, a processing circuit 159 for medium access control (MAC)/data link layer processing. Processing circuit 150 may include a memory controller 158 for communicating with processing circuit 159 and/or a base station management entity 160, for example, via interfaces 155.

In some embodiments of the present invention, PHY processing circuit 156 may include a frame construction and/or detection module, in combination with additional circuitry such as a buffer memory, to construct and/or deconstruct super-frames as in the embodiments previously described. Alternatively or in addition, MAC processing circuit 159 may share processing for certain of these functions or perform these processes independent of PHY processing circuit 156. In some embodiments, MAC and PHY processing may be integrated into a single circuit if desired.

Apparatus 130 may be, for example, a base station, an access point, a subscriber station, a device, a terminal, a node, a hybrid coordinator, a wireless router, a NIC and/or network adaptor for computing devices, a mobile station or other device suitable to implement the inventive methods, protocols and/or architectures described herein. Accordingly, functions and/or specific configurations of apparatus 130 described herein, may be included or omitted in various embodiments of apparatus 130, as suitably desired. In some embodiments, apparatus 130 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 130 may be implemented using single input single output (SISO) architectures. However, as shown in FIG. 2, certain implementations may include multiple antennas (e.g., antennas 148 and 149) for transmission and/or reception using adaptive antenna techniques for beamforming or spatial division multiple access (SDMA) and/or using multiple input multiple output (MIMO) communication techniques.

The components and features of station 130 may be implemented using any combination of discrete circuitry, application specific integrated circuits (ASICs), logic gates and/or single chip architectures. Further, the features of apparatus 130 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 130 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Figure 3:
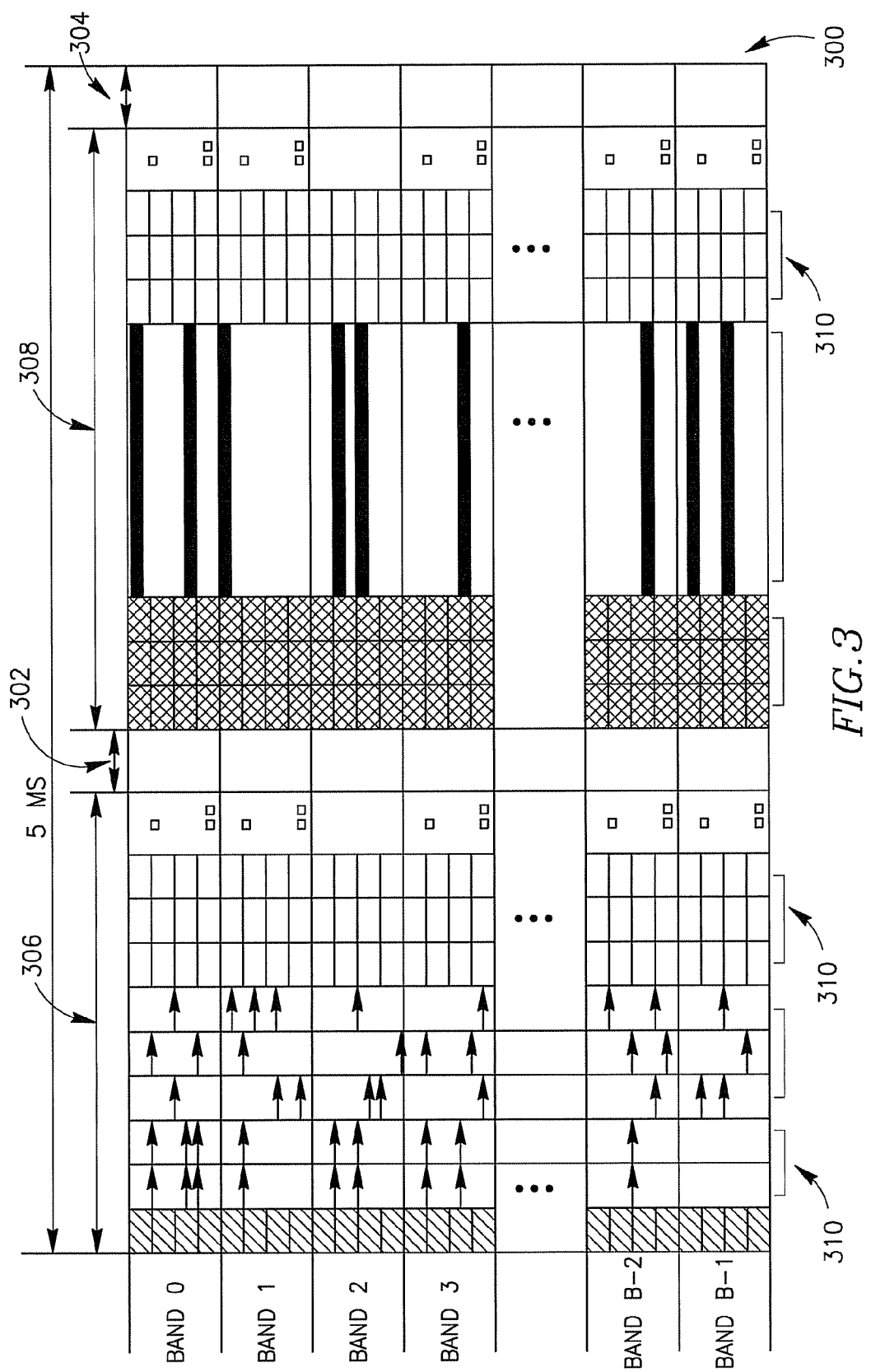
FIG. 3 is a schematic illustration of a frame structure according to an embodiment of the present invention.

Reference is made to FIG. 3, which schematically illustrates a frame 300 structure according to an embodiment of the present invention. Frame 300 (e.g., a radio frame) may be a portion of a transmitted and/or received communication in, for example, wireless network 100. In some embodiments, frame 300 may describe a periodically repeating segment structure of a larger communication signal or stream. In some embodiments, repeating frame 300 may include substantially different information, for example, during substantially each separate transmission. Frame 300 may be defined and may include broadband wireless access technology according to, for example, the IEEE 802.16e-2005 standard or mobile WiMAX profiles. According to the mobile WiMAX profiles, the duration of frame 300 or transmission time interval (TTI) may be, for example, approximately 5 ms. Other frame or radio frame sizes such as for example 2, 2.5, 4, 8, 10, 12, and 20 ms may be used as for example specified in the IEEE 802.16e-2005 standard specification.

In some embodiments, frame 300 may be transmitted and/or received, for example, according to a time division duplex (TDD) mode or scheme. Other time and/or frequency schemes may be used (e.g., such as a frequency division duplex (FDD) mode or scheme) according to embodiments of the invention.

Frame 300 may include an integer number of OFDM symbols or other multiplexing symbols. The number of OFDM symbols per frame may be determined, for example, according to a choice of OFDM numerology (e.g., sub-carrier spacing, cyclic prefix length, sampling frequency, etc.). In some embodiments, OFDM numerologies may be determined, set, or obtained, for example, depending, on a bandwidth and sampling frequency (e.g., or an over-sampling factor according to the mobile WiMAX profiles). In various embodiments, substantially different OFDM numerologies may be used, which may result in substantially different number of OFDM symbols in frame 300.

In some embodiments, frame 300 may include idle symbols and/or idle time slots. In one embodiment, frame 300 may include one or more switching periods 302 and/or 304, for example, for changing between a pre-designated downlink (DL) transmission 306 and a pre-designated uplink (UL) transmission 308 when a TDD duplex mode or scheme is used. In other embodiments, for example, when an FDD duplex scheme is used, since DL transmissions 306 and UL transmissions 308 may be sent substantially at the same or overlapping times (e.g., over different frequencies or network channels) frame 300 may include substantially few or no idle symbols, idle time slots, and/or switching periods 302 and/or 304.

In some embodiments, the TTI or the duration of frame 300 may be, for example, approximately 5 ms. A round trip time (RTT) (e.g., the time interval between two consecutive pre-designated DL transmissions 306 to a specific wireless node may be, for example, approximately 10 ms. Wireless networks (e.g., wireless network 100) having rapidly changing channel conditions and/or small coherence times (e.g., rapidly moving mobile stations or nodes, such as automobiles having vehicular speeds of, for example, in the excess of approximately 120 kilometers per hour (km/h)) may use mechanisms for supporting substantially high mobility in varying channel conditions. Embodiments of the invention may support wireless network 100 having substantially small round trip times, for example, to enable substantially fast-varying channel condition feedback between subscriber stations 110, 112, 114, and/or 116, such as a mobile station, and base station 118. Other time durations may be used.

The current IEEE 802.16e-2005 specification standard frame structure may include restrictions, such as substantially long TTIs that are typically not suitable for supporting substantially fast feedback and low access latency (e.g., less than 10 ms), which may be used by, for example, emerging radio access technologies.

Embodiments of the present invention may include or use a modified version of the frame 300 structure for supporting lower latency operations, while maintaining backward compatibility, for example, to the IEEE 802.16e-2005 standard specification frame structure. Frame 300 structure may be used, for example, in the next generation of mobile WiMAX systems and devices (e.g., including the IEEE 802.16m standard). In some embodiments, frame 300 structure or portions thereof may be transparent to the legacy terminals (e.g., which operate according to mobile WiMAX profiles and IEEE 802.16e-2005 standard) and may be used only for communication between BSs, subscriber stations, and/or MSs that both operate based on the IEEE 802.16m standard.

According to embodiments of the invention, wireless network 100 and components thereof, which may communicate using the new frame structure (e.g., described according to FIGS. 3-23), may be backward compatible with a reference network, which may communicate using a conventional/reference frame structure (e.g., described according to the mobile WiMAX profiles and based on the IEEE 802.16e-2005 standard). In some embodiments, backward compatibility may include for example, that a legacy terminal (e.g., which may communicate using conventional and/or reference frame structures) may operate in a wireless network with no significant impact on the performance and operation of the terminal relative to a conventional network. In some embodiments, a new (e.g., a non-legacy) terminal or subscriber station using the new (e.g., a non-legacy) frame structure may operate in a conventional network with no significant impact on the performance and operation of the terminal relative to the wireless network. For example, the new terminal may be "backward compatible". In some embodiments, wireless network 100 may support both legacy and new (e.g., a non-legacy) terminals, for example, at substantially the same time (e.g., where time division multiplexing of the new and legacy frames overlap in the same frame). In some embodiments, wireless network 100 may enable seamless communication, mobility, and handoff between legacy terminals and new terminals. When used herein, "new", "evolved" or "updated," and "next generation" are merely relative to "old", "legacy" or "current", etc. For example, a "new" standard may be a standard that is in use as of the date of the filing of this application, and a "legacy" system may be one that is in use both prior to the date of filing this application and for some time after the filing of this application; a "new" system is one implemented or developed after a "legacy" system, typically including improvements and updates. "New", "evolved", "updated", etc. systems are often backward compatible such that they are usable with "old", "legacy" or prior systems or standards.

According to embodiments of the invention, the new frame structure may include new synchronization and broadcast channels to extend the capabilities of the IEEE 802.16e-2005 standard by, for example, enhancing system acquisition and/or enhancing cell selection at low signal to interference+noise ratios (SINR). According to the IEEE 802.16e-2005 standard a broadcast channel (e.g., and a DL channel descriptor and UL channel descriptor) are typically not located at a pre-defined location in a frame, the mobile stations have to decode the common control channel (e.g., MAP) for acquiring system configuration information.

According to an embodiment of the present invention, the new frame structure may include for example a super-frame that includes an integer number of radio frames, which may include synchronization and/or broadcast information and/or messages, such as, system configuration information, which may simplify wireless network 100 operations and further reduce the overhead and acquisition latency of wireless network 100.

Figure 4:
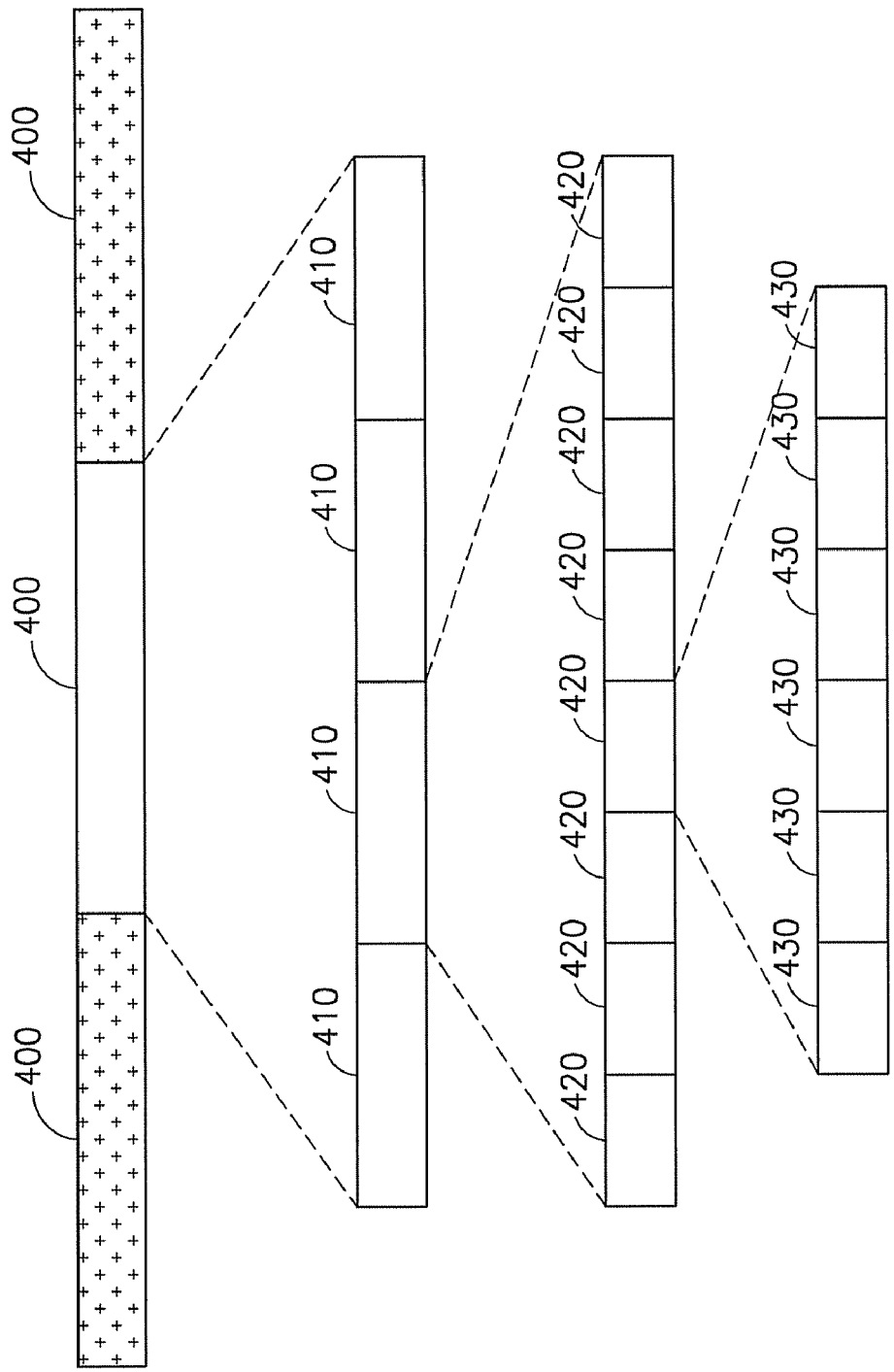
FIG. 4 is a schematic illustration of a super-frame structure according to an embodiment of the present invention.

Reference is made to FIG. 4, which schematically illustrates a super-frame 400 structure according to an embodiment of the present invention. In some embodiments, a transmission between terminals or nodes may include, for example, one or more super-frames 400. Super-frame 400 may include or be partitioned into a fixed and/or pre-determined number of frames 410. In other embodiments, the number of frames 410 in each of two or more of super-frames 400 may be different. The number of frames, M, 410 within a super-frame 400 (e.g., M, may be an integer, where M=2, 3, 4 . . . ) may be a design parameter and may be specified in a standard specification and, for example, may be fixed for a particular profile and deployment. In some embodiments, the number of frames 410 within super-frame 400 may be determined by one or more factors, including but not limited to, for example, target system acquisition time, a maximum permissible distance between two consecutive preambles (e.g., synchronization channels), the minimum number of preambles that may be averaged during system acquisition for the detection of the preamble, and/or a maximum permissible distance between two consecutive broadcast channels (e.g., system configuration information or paging channels).

In one embodiment, substantially each super-frame 400 may be partitioned into or include two or more (e.g., four (4)) frames 410. Other numbers of partitions, divisions, or frames may be used. The length of each frame 410 may be for example approximately 5 ms, for example, for establishing backward compatibility with systems compliant with IEEE 802.16e-2005 standard. Other frame or radio frame lengths may be used. Each of frames 410 may be further partitioned or sub-divided into two or more (e.g., eight (8)) sub-frames 420. Other numbers of divisions may be used. The length of sub-frame 420 may determine the TTI for terminals that may be compliant with the new standard and, for example, incorporate super-frame 400 and/or frame 410 structures. The beginning and end of each of the TTIs may be substantially aligned or synchronized with, for example, a sub-frame boundary. Each TTI may contain an integer number of sub-frames (e.g. typically one or two sub-frames). Each sub-frame 420 may be partitioned into or include a fixed number of OFDM symbols 430. In one embodiment, each sub-frame 420 may be partitioned into or include, for example, six (6) OFDM symbols, so that the number of OFDM symbols 430 within a sub-frame (e.g., the length of sub-frame 420) may be compatible to resource block sizes (e.g., sub-channels) corresponding to various permutation schemes, for example, specified in the IEEE 802.16e-2005 standard.

Figure 26:
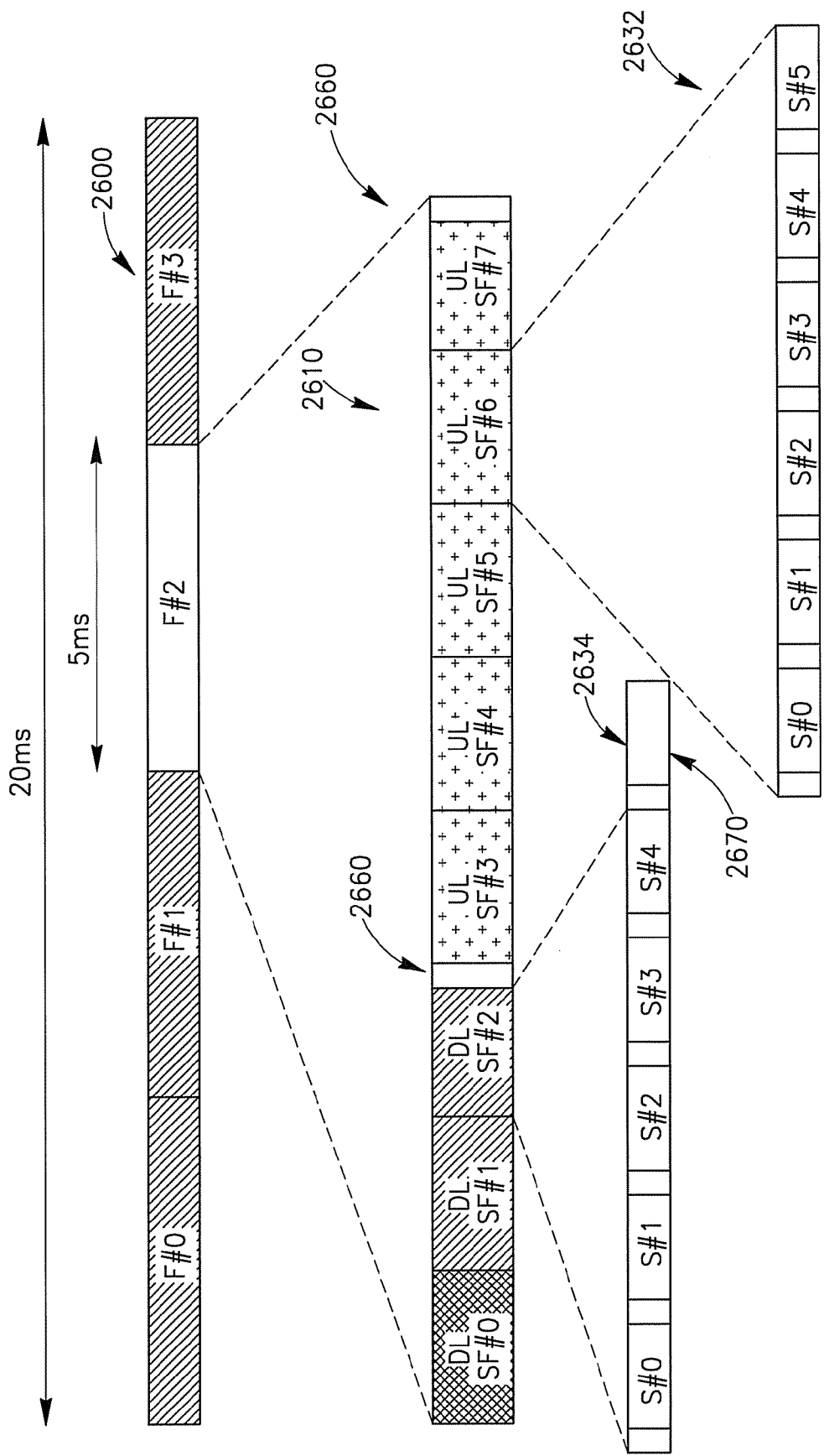
FIG. 26 is a schematic illustration of a super-frame structure communicating in a wireless network in TDD duplex mode having regular and irregular sub-frames according to an embodiment of the present invention.

FIG. 26, which schematically illustrates a super-frame 2600 structure communicating in a wireless network in TDD duplex mode having regular sub-frames 2632 and irregular sub-frames 2634 according to an embodiment of the present invention. In some embodiments, regular sub-frames 2632 typically do not include idle OFDM symbol or idle times and irregular sub-frames typically do not include one or more idle OFDM symbols 2670 or idle times. In TDD duplex mode, irregular sub-frames 2634 may be located substantially near switching points 2660 of frames 2610 of super-frame 2600. Regular sub-frames 2632 may be located in other location in frame 2610 (e.g., in TDD duplex mode). In FDD duplex mode, typically only regular sub-frames (e.g., and not irregular sub-frames 2634) are used. In some embodiments, sub-carriers corresponding to the idle OFDM symbols 2670 typically are not used for data and/or pilot or reference signal allocations.

In other embodiments, there may be other or alternative numbers, lengths, sizes, and/or variations, of super-frames 400, frames 410, sub-frames 420, and/or OFDM symbols 430. The numbers used herein are presented for demonstrative purposes only. In another embodiment, the length of frames 410 (e.g., approximately 5 ms) and the number of OFDM symbols 430 (e.g., six (6)), may be set for establishing backward compatibility with IEEE 802.16e-2005 standard compliant systems, devices, and/or transmissions.

Permutation schemes, for example, defined according to current standard specifications, may include a number, for example, from one to six, slots for transmitting signals and/or resource blocks. The boundary of physical a resource block may, for example, be aligned with a sub-frame boundary. In some embodiments, each physical resource block may be substantially contained within a single sub-frame 420. In other embodiments, each physical resource block may be substantially contained within two consecutive sub-frames.

It may be appreciated by those skilled in the art that embodiments of the invention, for example, including, super-frame 400 structures, may be applied using either of the TDD and FDD duplexing schemes or modes. In the FDD duplex mode, each of the DL and UL transmissions may be communicated, for example, concurrently, on respective frequencies or channels. In the TDD duplex mode, each of the DL and UL transmissions may be communicated, for example, at substantially non-overlapping intervals (e.g., according to time division multiplex (TDM) scheme) over substantially the same frequency or channel. In the TDD duplex mode of operation and within any frame 410, sub-frames 420 may be configured to DL and UL transmissions (e.g., DL transmission 306 and UL transmission 308) for example statically in each deployment. The DL and UL transmissions may be separated by idle times and/or idle symbols for switching between DL and UL transmissions (e.g., during switching periods 302 and/or 304).

In one embodiment of the invention, "legacy zones" and "new zones" may include periods, portions or zones, for example, of DL or UL transmission, specifically designed to substantially only communicate with legacy terminals or new terminals, respectively. In the TDD duplex mode of the IEEE-802.16-2005 standard, each of DL transmission 306 and UL transmission 308 may be further partitioned into two or more permutation zones. In some embodiments, the number of contiguous OFDM or other symbols 430 in a frame 410, may be referred to as, for example, a permutation zone (e.g., permutation zone 310, described in reference to FIG. 3). The permutation zone may, for example, include a number of contiguous OFDM symbols (e.g., in DL and UL transmissions 306 and 308, described in reference to FIG. 3) that use substantially the same permutation (e.g., partially used sub-channel (PUSC) to distributed allocation of sub-carriers, Adaptive Modulation and Coding (AMC) for localized allocation of sub-carriers, etc.).

According to an embodiment of the invention, a frame may include or may be partitioned into legacy zones and new zones (other terms may be used). In one embodiment, legacy terminals and new terminals may communicate using legacy zones and new zones, respectively. In some embodiments, new terminals may communicate using both legacy zones and new zones. Legacy terminals typically only communicate using legacy zones. In one embodiment, in the frame, each of DL transmissions may be further partitioned into two or more zones, for example, including a DL transmission legacy zones and a DL transmission new (e.g., non-legacy) zones and each of UL transmissions may be further partitioned into two or more zones, for example, including UL transmission legacy zones and UL transmission new (e.g., non-legacy) zones.

Figure 25:
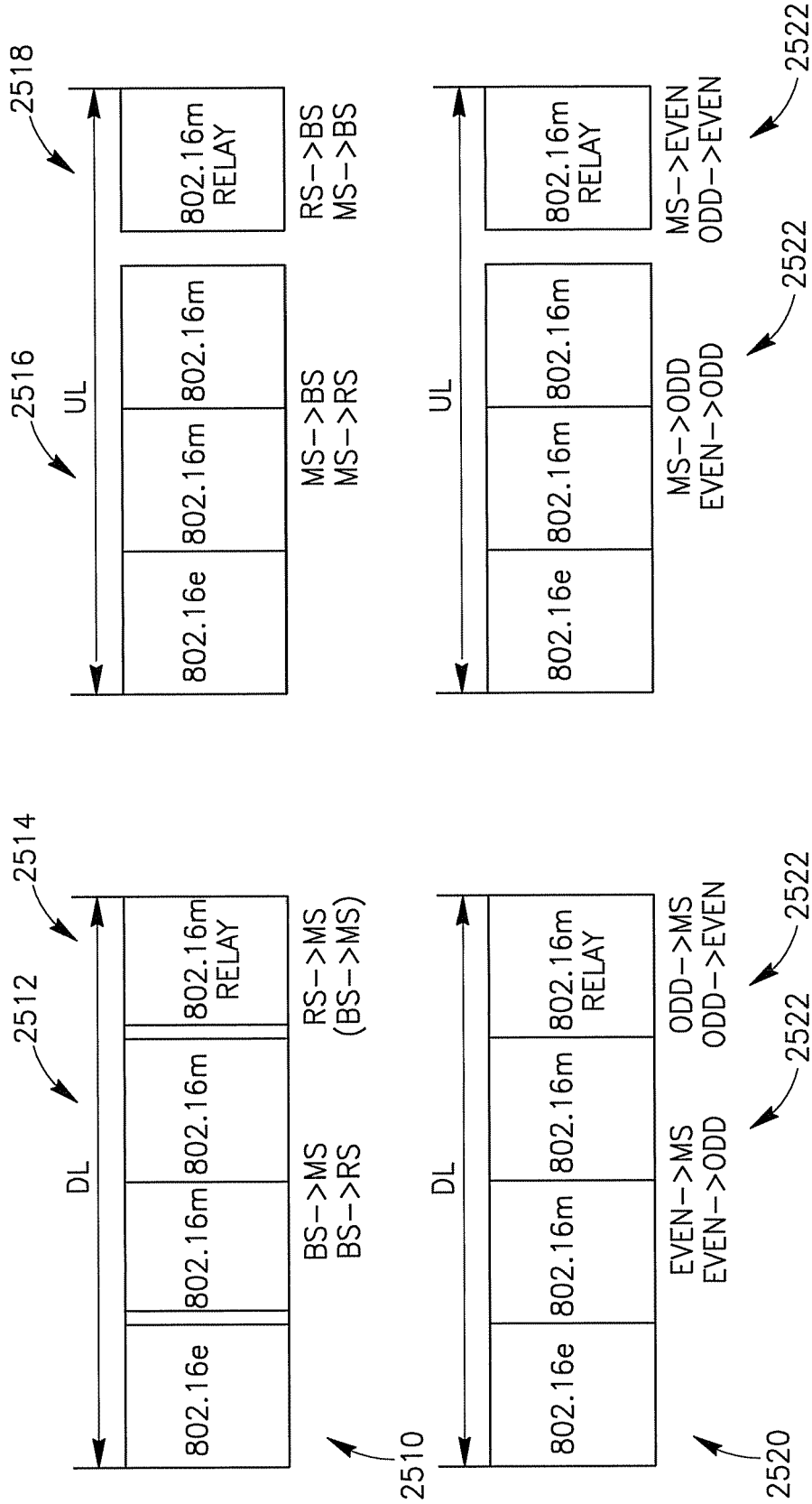
FIG. 25 is a schematic illustration of a frame structure for non-transparent relay operation with two-hops and multi-hops according to an embodiment of the present invention.

Reference is made to FIG. 25, which schematically illustrates a frame structure for a non-transparent relay operation with two-hops 2510 and multi-hops 2520 according to an embodiment of the present invention.

In one embodiment, a process may partition each of two or more frames into two or more sub-frames, wherein the frames may be defined according to a reference system standard. The process may transmit one or more of the two or more sub-frames for a non-relay transmission including transmitting a (DL:BS→MS/RS) sub-frame 2512 during a pre-designated downlink transmission and a (UL:MS/RS→BS) 2516 sub-frame during a pre-designated uplink transmission, and may transmit one or more of the two or more sub-frames for a relay transmission including transmitting a (DL:RS→MS) sub-frame 2514 during a pre-designated downlink transmission and a (UL:MS→RS) 2518 sub-frame during a pre-designated uplink transmission. In one embodiment, the process may support two-hop relay transmission, for example, with optimized latency. In one embodiment, the process may further partition each of the two or more frames by partitioning even-numbered hop zones into (DL:BS→MS, BS→odd RS, even RS→odd RS) zones during a pre-designated downlink transmission and (UL:MS→BS, odd RS→BS, odd RS→even RS) during a pre-designated uplink transmission and odd-numbered hop zone into (DL: odd RS→even RS, odd RS→MS) zones during a pre-designated downlink transmission and (UL:MS→odd RS, even RS→odd RS) during a pre-designated uplink transmission. The further partitioning may, for example, support multi-hop relay transmission. Other partitions may be used. Embodiments of the invention may support transparent relay, for example, when the RS does not transmit a preamble, a broadcast, and control channels, and may support non-transparent relay, for example, when the RS transmits a preamble, a broadcast, and control channels. Other configurations may be used.

Embodiments of the invention may support such relay operations, for example, in the TDD duplex mode in IEEE 802.16m, by allocating DL and UL zones, and a number of legacy and new zones for communications between the RSs and the BSs (e.g., RS←→BS), RSs and RSs (e.g., RS←→RS), or RSs and mobile terminals (e.g., RS←→MS) as shown in FIG. 25. An embodiment of the present invention may support both transparent and non-transparent relay operations. In a transparent relay operation, the relay stations may not separately transmit timing, broadcast, or control information that is typically transmitted by a base station. In non-transparent relay operation, the relay stations may separately transmit timing, broadcast, and control information similar to a conventional base station. A receive to transmit or transmit to receive gap may be, for example, inserted between two neighboring DL and UL zones. In some embodiments, in non-transparent relay operations, each relay station may transmit a unique preamble and may use a frame structure according to embodiments of the invention. In some embodiments, substantially each relay station may transmit a common control channels and/or MAP signals, which may be different or the same as common control channels and/or MAP signals transmitted by the base station. MAP signals may, for example, describe the resource allocations of the DL and UL new and/or legacy relay zones. Base stations and relay stations may coordinate schedulers in order to control interference within these zones.

Embodiments of the present invention may support transparent relays deployed within multiple sectors of a base station or other unit. In one embodiment, only new preambles, frame control headers, and MAPs may be transmitted in the first new DL zone. New terminals (e.g., including mobile stations and relay stations) may synchronize with the new (e.g., supplementary) preamble to receive the MAP signals. The MAP signals may describe frame resource allocations in relay and non-relay zones (e.g., of new zones) in the DL and UL zones. In DL zones, data may be transmitted directly from the BS to an MS and may be scheduled in either a new relay or non-relay DL zone. The relayed information may be initially transmitted from the BS to the RS, for example, in the new DL zone and then transmitted from the RS to the MS, for example, in the relay zone. In UL zones, the BS may schedule MS transmissions. In one embodiment, the MS transmissions may be relayed by an RS, which may be transparent to the MS.

Embodiments of this invention may be used to support multiple (e.g., two or more) relay hops, as shown in FIG. 25. In FIG. 25, each of even-numbered relay hops and odd-numbered relay hops may include two sub-types of zones 2522. In some embodiments, the beginning of each relay zone may contain timing and/or control information. The synchronization channel of each relay station may be assigned a unique code.

Embodiments of the invention may provide a partitioning of frames into sub-frames (e.g., where the boundaries of transmission blocks or zones may be synchronized with the sub-frame boundaries). According to the IEEE-802.16e-2005 standard, the boundaries of transmission blocks or zones may start and end at any OFDM symbol within the boundary of a frame. According to embodiments of the invention, the new zones may use a new and more efficient resource allocation and feedback mechanism. The total number of OFDM symbols within a frame may vary depends on the OFDM numerology. In order to maintain backward compatibility with the legacy mobile WiMAX systems, the same frame size and OFDM numerology (e.g., or OFDM parameters) may be used for the IEEE 802.16m systems and the legacy mobile WiMAX systems. It may be appreciated by those skilled in the art that all permissible numerologies and/or frame sizes, for example, specified by the 802.16e-2005 standard, may be used in accordance with embodiments of the present invention.

Embodiments of the invention may provide super-frame structures that may be compatible with conventional standards, such as, the IEEE 802.16e-2005 standard and/or other standards. For example, the super-frame structure may include or may be compatible with a subset of features, for example, as specified in the mobile WiMAX profile (e.g., and may be backwards compatible with the mobile WiMAX profile).

Embodiments of the invention may provide a super-frame structure, which may be partitioned into a number of frames that include, for example, one or more, legacy synchronization channel (e.g., a IEEE 802.16e preamble), supplemental synchronization channels (e.g., a IEEE 802.16m preamble), broadcast channel (BCH), medium access protocol (MAPs) or common control channel (CCCH) in the new and legacy zones corresponding to each frame or an integer number of frames.

Figure 5:
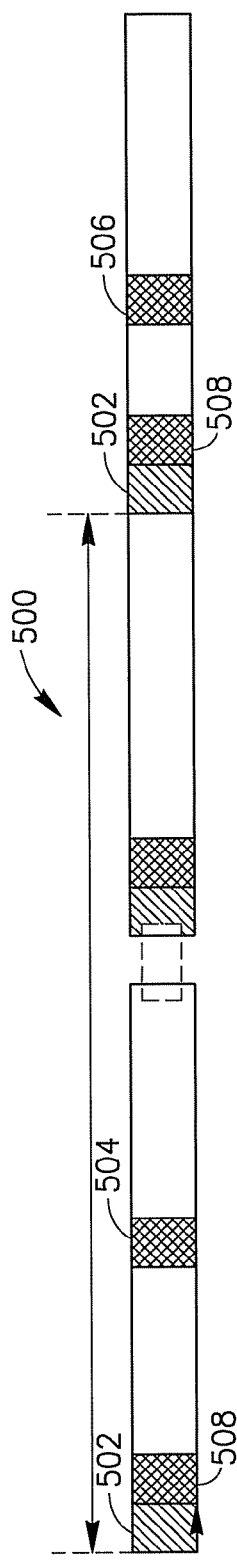
FIG. 5 is a schematic illustration of a super-frame structure according to an embodiment of the present invention.

Reference is made to FIG. 5, which schematically illustrates a super-frame 500 structure according to an embodiment of the present invention. In one embodiment, super-frame 500 may include a legacy preamble 502, for example, which may be referred to as primary synchronization channel (PSCH). In some embodiments, super-frame 500 may include an additional or supplemental preamble 504, for example, for improving system timing acquisition and cell selection for new terminals. Supplemental preamble 504 may, for example, be referred to as secondary synchronization channel (SSCH). The synchronization channels may include sequences, which may be used and/or deciphered by both base stations and mobile stations, for example, for acquiring frame timing and/or scheduling.

In some embodiments, supplemental preamble 504 may be effectively or partially transparent, unreadable, or undetectable to legacy terminals, while legacy preamble 502 may be detectable to both legacy and new terminals. In some embodiments, super-frame 500 may include a broadcast channel (BCH) 506. The broadcast channel may contain information that may for example include system configuration information, paging, and/or other broadcast type information, and may be sent by a base station to all mobile stations in the network and/or surrounding area.

Figure 9:
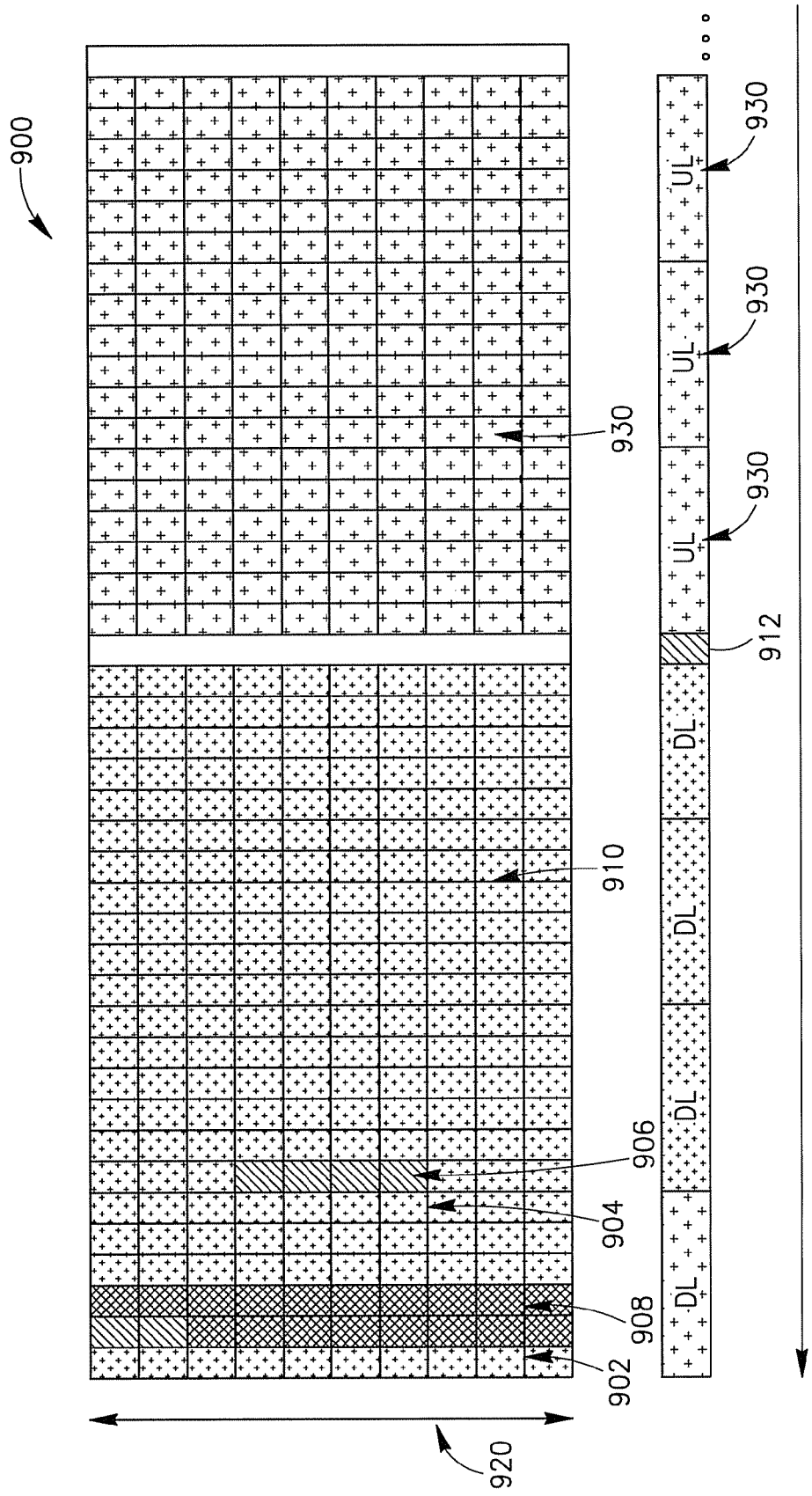
FIG. 9 is a schematic illustration of a frame structure partitioned in the time and/or frequency domain according to an embodiment of the present invention.

As shown in FIG. 5, supplementary or new preamble 504 (e.g., SSCH) may be located at a fixed position in new or legacy zones. In one embodiment of the present invention, for example, the supplemental preamble 504 may be positioned at a fixed offset, which may be referred to as, for example, "SSCH_OFFSET". The SSCH_OFFSET may be a measure of a location of the supplemental preamble 504, for example, relative to the location of the legacy preamble, for example, in every frame. In some embodiments, the legacy preamble in mobile WiMAX systems may be located in the first OFDM symbol of every frame (as shown in FIG. 9). The value of SSCH_OFFSET may be included and broadcasted as part of the system configuration information. In some embodiments, when supplemental preamble 504 is detected by a mobile terminal, the SSCH_OFFSET may be used to locate the beginning of a frame. In one embodiment, when SSCH_OFFSET=0, there may be no legacy preamble 502, which may indicate that the network does not support legacy terminals. In some embodiments, a new synchronization channel and the broadcast channel may span a minimum system bandwidth (BW). In some embodiments, the legacy synchronization channel typically spans the entire system BW, an example of which is shown in FIG. 9. The region pre-designated for communicating supplementary preamble 504 (e.g., via multiple sub-carriers) may be, for example, transparent and/or ignored by legacy terminals. A scheduler for downlink base station or terminal transmissions typically does not allocate user/system traffic/control/signaling in the region pre-designated for communicating supplemental preamble 504.

Figure 6:
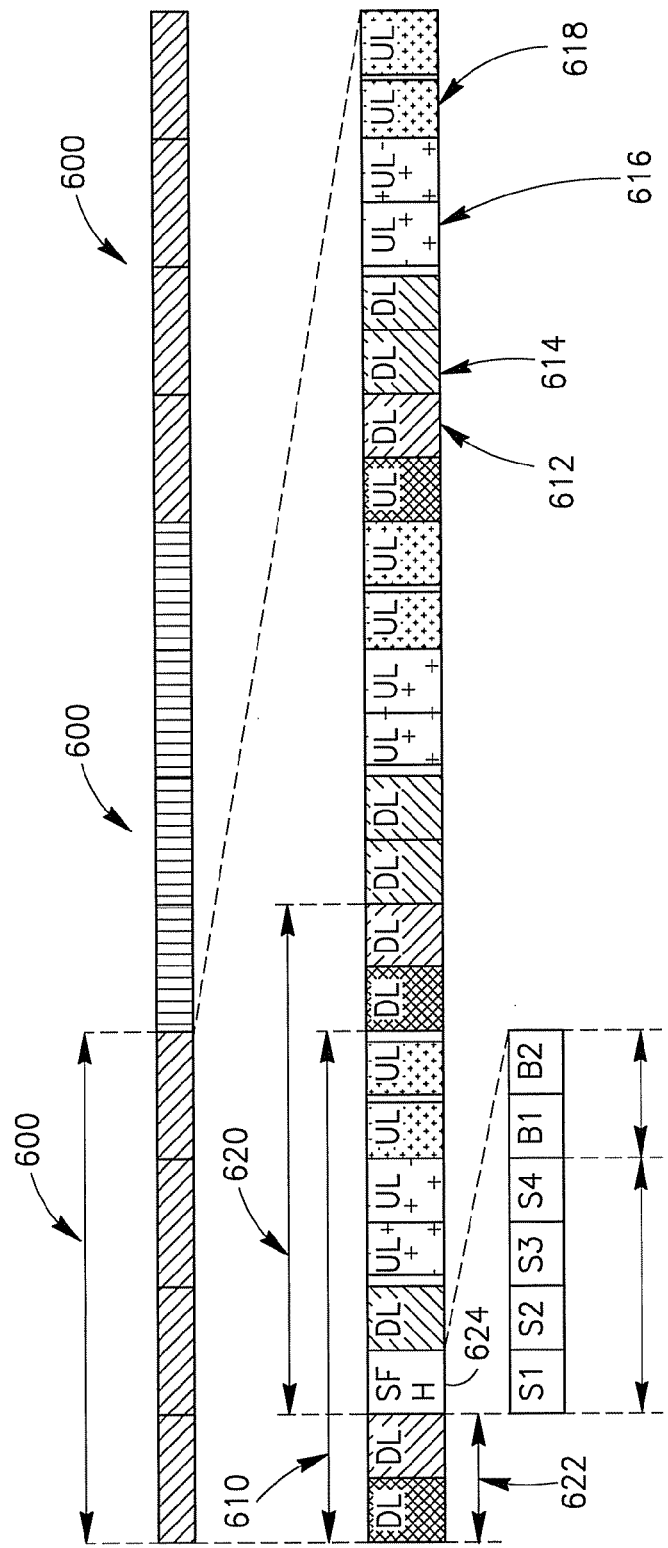
FIGS. 6, 6A, and 6B are schematic illustrations of super-frame structures according to an embodiment of the present invention.
Figure 6A:
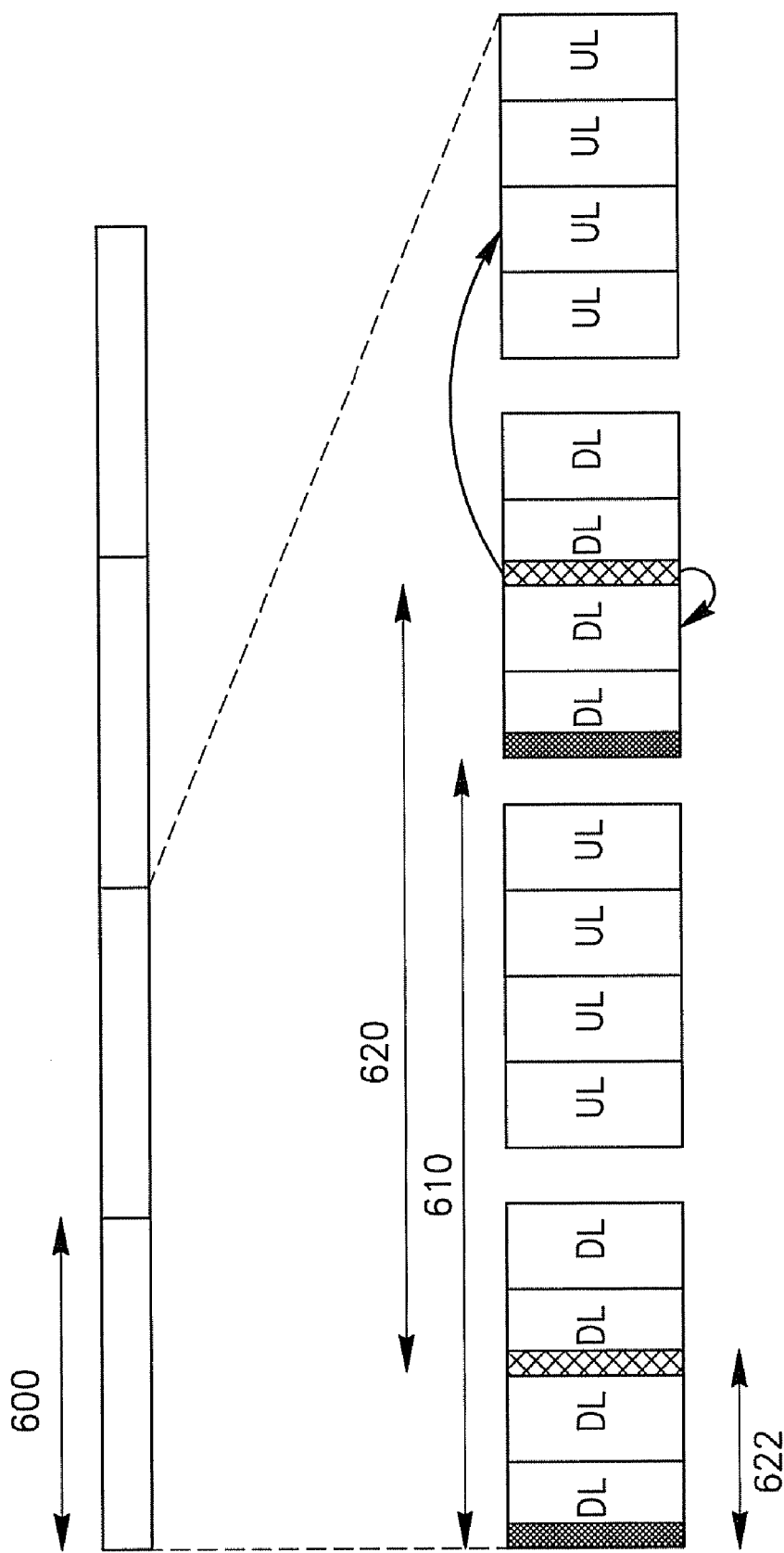
Figure 6B:
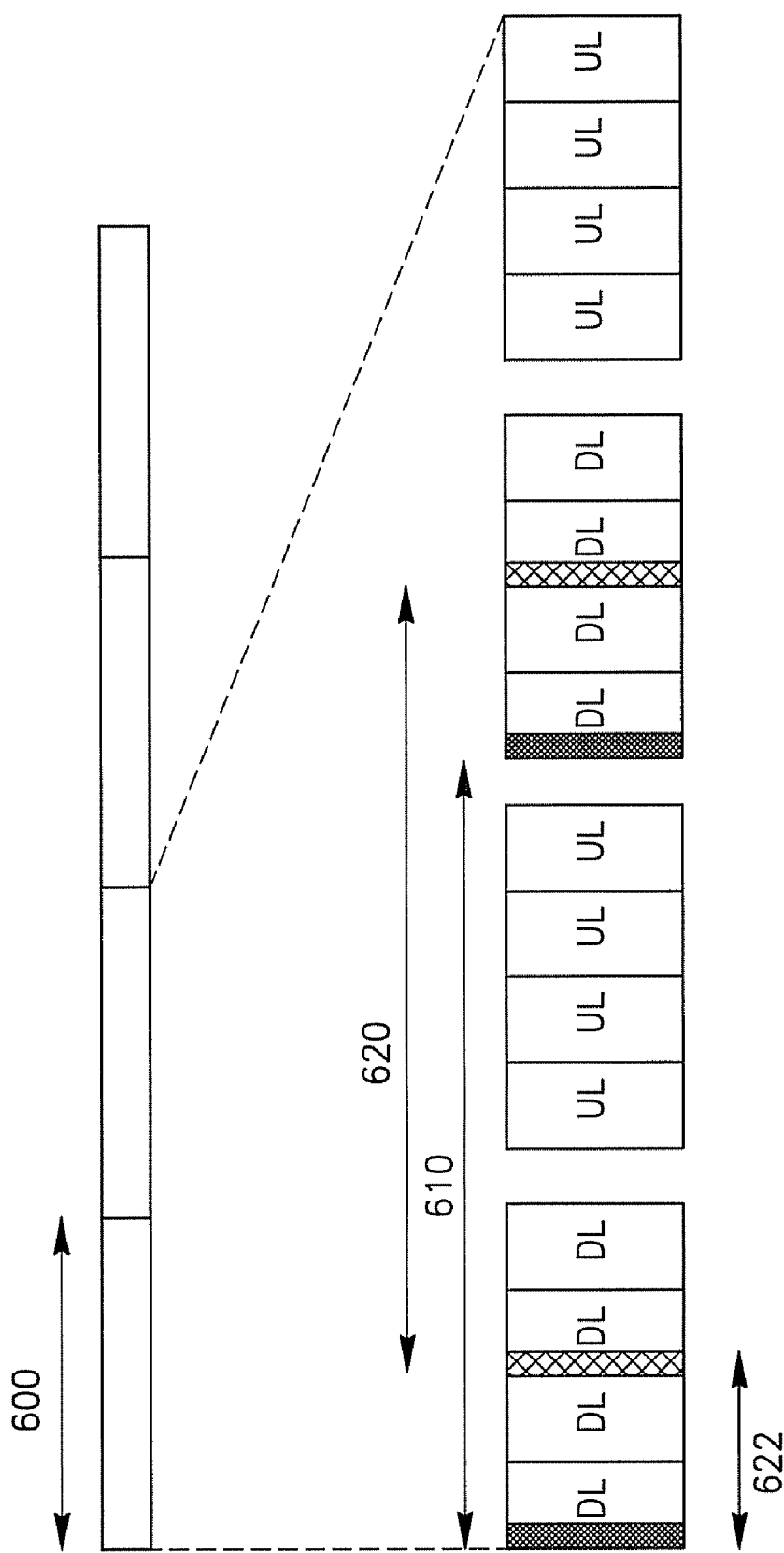

In another embodiment of the present invention, for example, supplementary preamble 504 may be located, for example, in the beginning of the new frame where the new frame may be located at a fixed offset relative to the legacy frame. In one embodiment, the fixed offset may be referred to as, for example, "FRAME_OFFSET", and may be fixed within the frame timing. In some embodiments, the value of the FRAME_OFFSET may be set by a network operator or administrator (e.g., and not broadcast). The new mobile terminals may detect supplemental preamble 504, which may indicate the beginning of the new frame and, for example, other information channels relative to the beginning of the new frame (e.g., as shown in FIG. 6). For example, the timing or periodicity of BCH 506 may be substantially aligned with the timing or periodicity of super-frame 500 transmissions.

In various embodiments, super-frame 500 may have substantially different structures, which may be distinguished, for example, based on the relative position of legacy preamble 502 and/or supplemental preamble 504 in super-frame 500, and/or other features or design considerations for the frame structure (e.g., such as a DL scan latency, physical layer overhead, and other information). It may be appreciated to those skilled in the art that although three options for the structure of super-frame 500, including for example, options I, II, and III, may be described, various other structures and/or variations thereof may be used in accordance with embodiments of the present invention.

The description that follows may include embodiments that may individually or collectively be referred to as Option I. Option I, and other "Options" presented herein are examples only, and are non-limiting.

In some embodiments, supplementary preamble 504 and/or BCH 506 may be positioned substantially at the beginning of each super-frame 500, for example, in the first frame of each super-frame 500 in a communication stream. In such embodiments, legacy preamble 502 and supplemental preamble 504 may be separately positioned (e.g., spaced or offset along the length of super-frame 500). In such embodiments, the impact or visibility of supplemental preamble 504 to legacy terminals (e.g., which typically only detect legacy preamble 502) and operations thereof, such as, system acquisition, may be minimized. Supplemental preamble 504 may be periodically repeated at any desirable frequency, for example, substantially every frame. BCH 506 may contain system-configuration information, paging channels, and/or other broadcast information. In some embodiments, BCH 506 may be synchronized with super-frame 500 intervals and may appear every integer number of super-frames. In some embodiments, new terminals may use supplemental preamble 504 (e.g., exclusively or additionally) to improve system timing acquisition and fast cell selection. For example, supplemental preamble 504 may include cell identification (ID) information or codes and may be used for acquisition of frame timing by new terminals. For example, a cell ID code may include a concatenated base station group ID code, base station ID code, a sector ID code, and/or other codes or information, for example, to simplify the detection (e.g., execute a structured search) of the cell ID.

Figure 18:
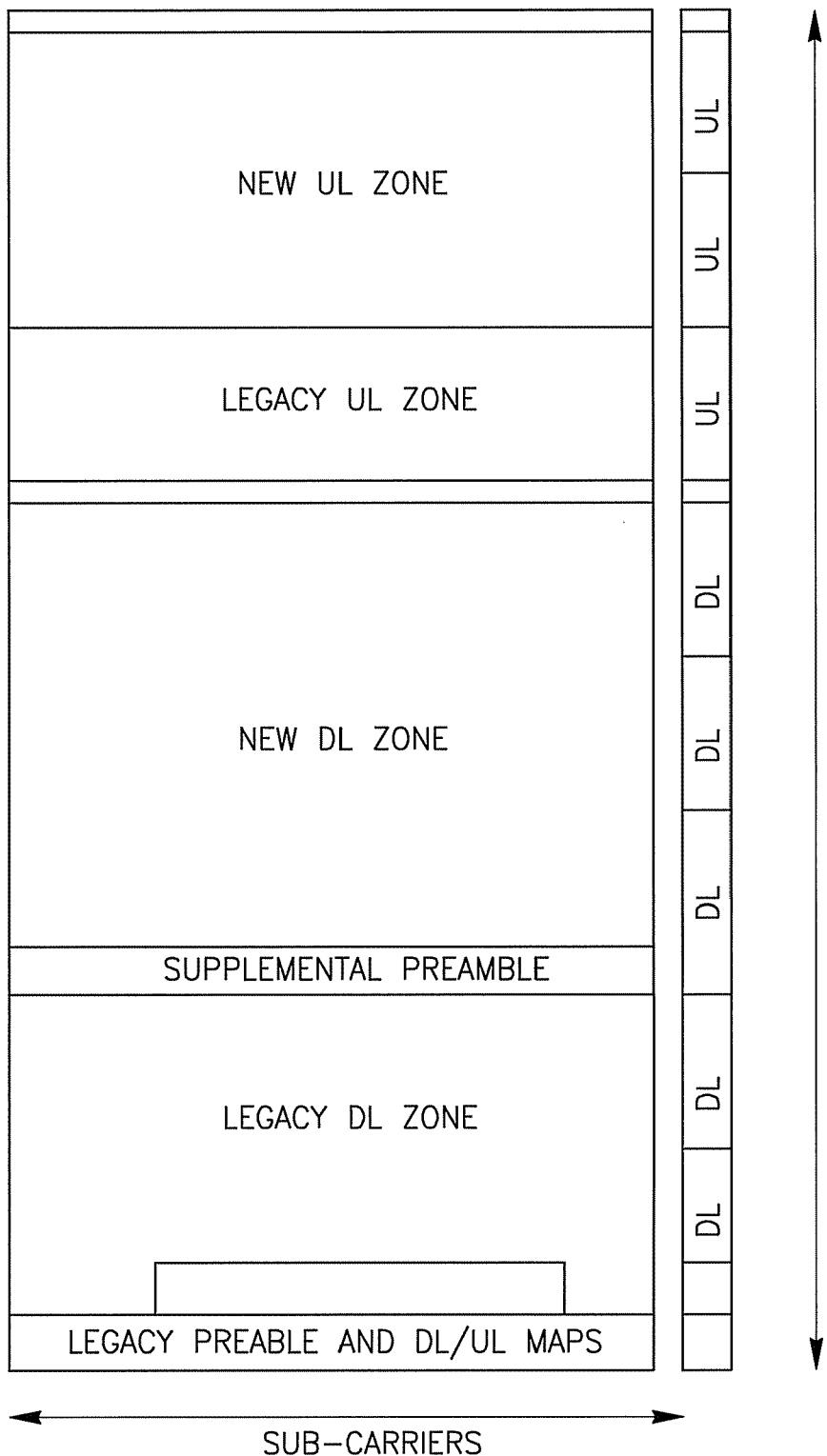

According to embodiments of the invention described in reference to Option I, since supplemental preamble 504 may be spaced from legacy preamble 502, supplemental preamble 504 may be minimally detectable by legacy terminals. In some embodiments, in order to minimize the physical layer overhead (layer 1 overhead), for example, which may be increased by using an OFDM symbol for transmitting supplemental preamble 504, supplemental preamble 504 may be transmitted, for example, over a limited (e.g., minimal) bandwidth or time, or by using additional sub-carriers corresponding to the same OFDM symbol for scheduling user traffic, for example, as shown in FIGS. 9 and 18.

The description that follows may include embodiments that may individually or collectively be referred to as Option II.

Reference is made to FIG. 6, which schematically illustrates a super-frame 600 structure according to an embodiment of the invention. In some embodiments for TDD duplex mode, super-frame 600 may be partitioned into, for example, four frames with pre-designated legacy periods, intervals or zones and new or non-legacy periods, intervals or zones. In one embodiment, legacy frame 610 may be further partitioned into sub-frames, including, for example, DL transmission legacy zones 612 and UL transmission legacy zones 616. The new frame 620 may begin at a fixed offset (e.g., FRAME_OFFSET) relative to the beginning of the legacy frame. The value of the FRAME_OFFSET may be an integer number of sub-frames and may be determined based on the ratio of the lengths or time of the DL to UL transmissions (e.g., in TDD duplex mode). For example, when FRAME_OFFSET=$T_{offset}$ and $T_{sub\text{-}frame}$ denotes the length of the sub-frame and $T_f$ denotes the frame length the value of the minimum and maximum permissible values for $T_{offset}$ may be determined as follows:

$T_{offset} \leq \alpha T_f$
$0 \leq \alpha \leq 1$: the fraction of frame allocated to DL
Example: $\alpha=0.625$ for DL:UL=5:3
$nT_{sub\text{-}frame} \leq \alpha T_f - T_{offset}$ $1 \leq n < 7$
$T_{offset} = mT_{sub\text{-}frame}$ $0 \leq m < $(Number of DL Sub_Frames)$-n$ In some embodiments, legacy terminals may communicate using legacy frames 610 and new terminals may communicate using new frames 620 and/or legacy frames 610.

According to embodiments of the invention, for example, in option III, the beginning of new frames 620 and legacy frames 610 may be offset by a fixed value, for example, by a frame offset 622 or an offset interval (e.g., a fixed duration of time and/or number of sub-frames).

The relative positions of new frames 620 and legacy frames 610 according to one embodiment are depicted in FIG. 6, for example, in TDD duplex mode. For example, in TDD duplex mode, legacy frame 610 structure may start with a DL transmission 612 and end with an UL transmission 616. For example, new frame 610 structure may start with a DL transmission 614, followed by a UL transmission 618, and end with a DL transmission 614.

In some embodiments, each new frame 610 may contain a supplemental preamble (e.g., SSCH), for example, in a sub-frame at the start or beginning of frame 610.

In other embodiments, each super-frame 600 may include a super-frame header (SFH) 624, for example, in a sub-frame at the start or beginning of super-frame 600. For example, SFH 624 may include a supplementary preamble and a broadcast channel.

For example, K and 6−K, K=1, 2, ..., 6 may denote the number of OFDM symbols that are allocated to supplementary preamble and broadcast channel, respectively. The number of OFDM symbols allocated to supplementary and legacy preambles may be as small as one OFDM symbol per channel. In one embodiment, the remainder of the OFDM symbols available in the SFH 624 sub-frame may be allocated, for example, for user traffic, control, and/or control and signaling information, which may minimize the system layer 1 overhead.

SFH 624 may include a supplemental preamble sequence and the broadcast information (e.g., including system configuration information and a paging channel). In some embodiments, legacy frames and new frames may have a fixed frame offset 622, which may be configurable by the network operator.

In some embodiments of the present invention, the legacy zone and new zone may be offset by a fixed number of sub-frames. The offset value may be substantially stable or fixed within a practical deployment. Due to the dynamic nature of network traffic in practice, in some frames, the legacy zone may be under-utilized while the new zone may be fully loaded or vice versa. In some embodiments, a pointer in a IEEE 802.16m common control channel may be designed and/or used, for example, to point to or indicate a sub-frame in the legacy zone that may be unused by legacy terminals. For example, when legacy zone and/or new zone partitions are fixed, the resources (e.g., sub-frames) may be dynamically allocated from frame to frame maximize the use of physical resources, which may otherwise be unused.

The description that follows may include embodiments that may individually or collectively be referred to as Option III.

Reference is made to FIG. 7, which schematically illustrates a super-frame 700 structure having a supplemental preamble 704 multiplexed with a legacy preamble 702, according to an embodiment of the present invention. In some embodiments, a supplemental preamble 704 may be multiplexed with a legacy preamble 702, for example, every M frames (e.g., where M may be the number of frames within a super-frame 700). For example, the first OFDM symbol of the first frame 710 in super-frame 700 may include supplemental preamble 704 and the M−1 succeeding frames 710 in super-frame 700 may include legacy preamble 702. In some embodiments, a common control channel (e.g., including DL and UL MAPs) and/or frame control header (FCH) 708 and a BCH 706 transmission may occur, for example, at super-frame 700 and frame 710 intervals, respectively.

The acquisition of legacy preamble 702 (e.g., by legacy terminals) may break as a result of interruption in the reception of the periodic legacy preamble 702. Since supplemental preamble 704 and legacy preamble 702 may share physical resources, for example, and may be transmitted at substantially the same or overlapping times or locations along super-frame 700, there may typically be no additional physical resource needed for including the supplemental preamble 704 into a super-frame 700 structure. Additionally, in some embodiments, the position of supplemental preamble 704 may be fixed within a periodic number (one or more) of frames 710.

In some embodiments, when supplemental preamble 704 and legacy preamble 702 are code division multiplexed, for example, in substantially the same OFDM symbol, there is typically no substantial impact on the layer 1 overhead. In such embodiments, some legacy preambles 702 may be transmitted in succession and, for example, other legacy preambles 702 may be superimposed with supplemental preamble 704 (e.g., according to multiplexing scheme discussed herein).

In some embodiments, supplemental preamble 704 may be multiplexed with legacy preamble 702 using, for example, a code division multiplex (CDM) scheme. A CDM scheme may include code division multiplexing supplemental preamble 704 and legacy preamble 702, for example, substantially every M frames 710, for example, as shown in FIG. 7.

In one embodiment, supplemental preamble 704 and legacy preamble 702 sequences may be superimposed and transmitted (e.g., by a new base station or terminal) every M frames, for example, according to the following equation:

$y_k = u_k + \chi_k u'_k$ where $u_k$, $u'_k$, $\chi_k$ may denote the $k^{th}$ primary synchronization sequence, the $k^{th}$ new synchronization sequence, and the $k^{th}$ spreading function. Other (e.g., linear) combinations may be used.

For example, the spreading function may include a set of robust spreading functions, which may substantially cover the new synchronization sequences. Other multiplexing schemes or combinations thereof may be used.

In one embodiment, legacy preamble 702 and supplementary preamble 704 may be, for example, code division multiplexed every fixed number (e.g., M=1, 2, 3 . . . ) frames. In such embodiments, legacy terminals may experience or include a small degradation in the energy of the legacy preamble every M frames. The new terminals may detect and extract supplemental preamble 704 that may encroach or may be superimposed on legacy preamble 702. As presented herein, supplementary preamble may be referred to, for example, as "new preamble", "supplemental preamble", "new synchronization channel", "SSCH" and "supplemental synchronization channel", a new system, profile, and/or standard, may be referred to, for example, as an "evolved version" of the reference system standard.

Reference is made to FIG. 8, which schematically illustrates a super-frame 800 structure having a supplemental preamble 804 multiplexed with a legacy preamble 802, where legacy preamble 802 may be obscured from legacy terminals, according to an embodiment of the present invention.

In some embodiments, the superposition of supplementary preamble 804 on the legacy preamble 802 may, for example, increase interference levels or, for example, an interference over thermal 820 (IoT) value. The objective is to maximize the IoT while maintaining a minimum Signal to Interference+ Noise Ratio (SINR) that is required for detection of the legacy preamble.

In one embodiment of the present invention, a signal received at the $s^{th}$ sub-carrier, $y_s$, may be calculated, for example, as shown in the equations that follow. In one embodiment, supplemental preamble 804 associated with each new base station or relay station may be substantially different, for example, for enabling a mobile station to distinguish, detect, and/or select, different base stations or relay stations in a network. In some embodiments, since the received power 822 of supplemental preamble 804 may be determined, or be directly proportional to, the IoT 820, it may be desirable for the IoT 820 to be maximized, for example, to the extent that the minimum SINR level would allow the legacy terminals to correctly detect legacy preambles 802. In some embodiments, an optimization of the IoT 820 value may be performed, for example, according to the equations that follow:

$$y_s = H_{s,k} u_k + H_{s,k} \chi_k u'_k + w_s + \sum_{i \neq k} H_{s,i} u_i + \sum_{l \neq k} H_{s,l} \chi_l u'_l$$

$$SINR_s = 20 \log_{10} \frac{|H_{s,k} u_k|}{\left| H_{s,k} \chi_k u'_k + w_s + \sum_{i \neq k} H_{s,i} u_i + \sum_{l \neq k} H_{s,l} \chi_l u'_l \right|}$$

$$SINR_s \geq 10 \log_{10} \frac{|H_{s,k} u_k|^2}{|H_{s,k} \chi_k u'_k|^2 + |w_s|^2 + \left| \sum_{i \neq k} H_{s,i} u_i \right|^2 + \left| \sum_{l \neq k} H_{s,l} \chi_l u'_l \right|^2}$$

$$IoT = |H_{s,k} \chi_k u'_k|^2$$

$$SINR_{smin} = 10 \log_{10} \frac{|H_{s,k} u_k|^2}{|w_s|^2 + \left| \sum_{i \neq k} H_{s,i} u_i \right|^2 + \left| \sum_{l \neq k} H_{s,l} \chi_l u'_l \right|^2 + IoT_{max}}$$

where terms may be defined, for example, as follows:
$y_s$: Received Signal at sth Sub-Carrier
$u_k$ Legacy Preamble Sequence sent by kth BS
$H_{s,k}$: Multi-Path Channel Impulse Response
$u'_k$: New Preamble Sequence sent by kth BS
$\chi_k$: kth Spreading Function
$w_s$: Received Noise at sth Sub-Carrier
  $SINR_s$: Signal to Interference+Noise Ratios for Legacy Terminals $$\sum_{l \neq k} H_{s,l} \chi_l u'_l:$$

Inter-Cell Interference due to New and Legacy Preambles

Other criteria for the optimization of the IoT value may be used. In some embodiments, when legacy preambles 702 and 802 are code division multiplexed, transmitting supplemental preamble 704 and 804, respectively, may have substantially no or minimal effect on the physical layer overhead of the system in which they are transmitted.

In such embodiments, superimposing supplemental preamble 804 onto legacy preamble 802 respectively, may limit the received power 822 of supplemental preamble 704 and may potentially interfere with or obscure system acquisitions of legacy preamble 802 by legacy terminals, for example, due to additional interference from supplementary preambles transmitted by neighboring base stations or relay stations. The effect of additional interference may be minimized, for example, using robust preamble detection algorithms, for example, having minimal sensitivity to instantaneous degradation in the preamble power.

It may be appreciated by those skilled in the art that each of three options for embodiments of the structure of a super-frame and/or partitions thereof, including for example, embodiments described in reference to each of options I, II, and III, may be applied to both TDD and FDD duplex schemes. The size and distribution of the new and legacy zones and their corresponding DL and UL transmissions and/ or sub-frames, may depend, for example, on factors including but not limited to the distribution of the new and legacy terminals, network load and performance optimizations for new and legacy terminals.

Figure 10:
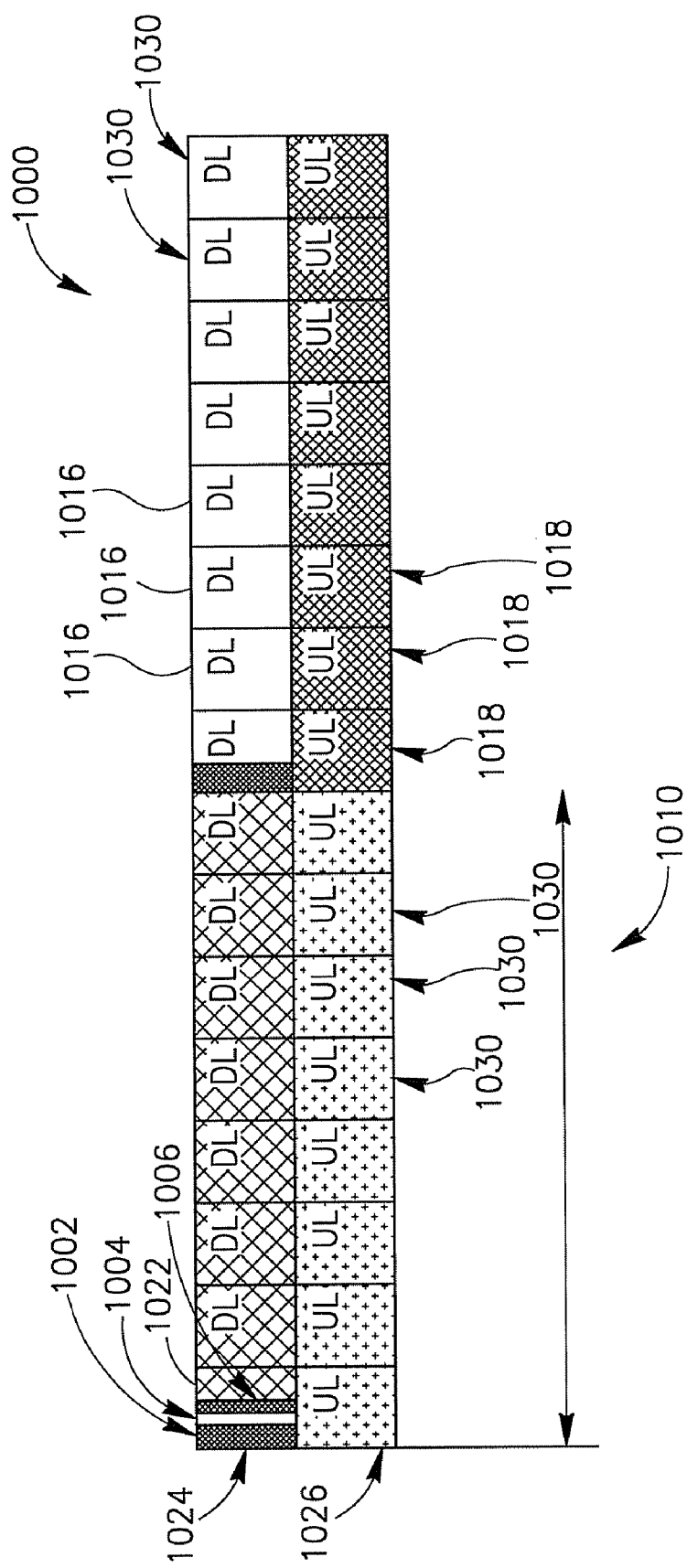
FIG. 10 is a schematic illustration of a frame structure in FDD duplex mode according to an embodiment of the present invention.

Reference is made to FIG. 10, which schematically illustrates a frame 1000 structure in FDD duplex mode according to an embodiment of the present invention. Frame 1000 may include sub-frames 1030. In some embodiments, super-frame 1000 may include a legacy preamble 1002, a supplemental preamble 1004, and a BCH 1006, which may be transmitted every integer number of super-frame transmissions. In one embodiment, legacy preamble 1002, supplemental preamble 1004, and/or BCH 1006 may be positioned at the beginning of frame 1000. According to embodiments of the invention, in the FDD duplex mode, DL transmissions 1016 and UL transmissions 1018 may occur substantially simultaneously, for example, at different frequencies (e.g., DL frequency $F_1$ 1024 and UL frequency $F_2$ 1026, respectively).

Figure 11:
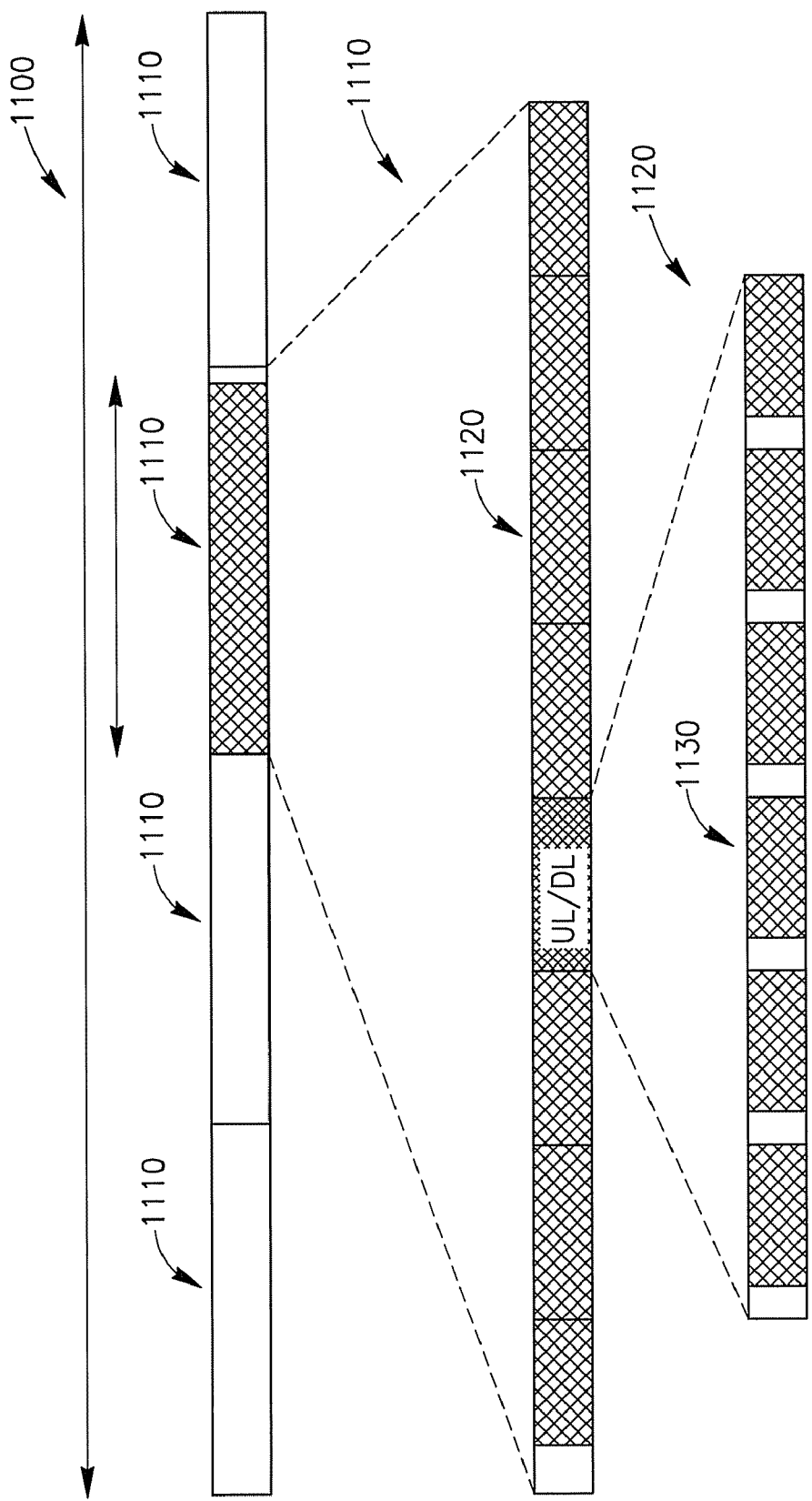
FIGS. 11-14 are schematic illustrations of super-frames and their respective frames, each having substantially different cyclic prefix and duplex modes, according to embodiments of the present invention.
Figure 12:
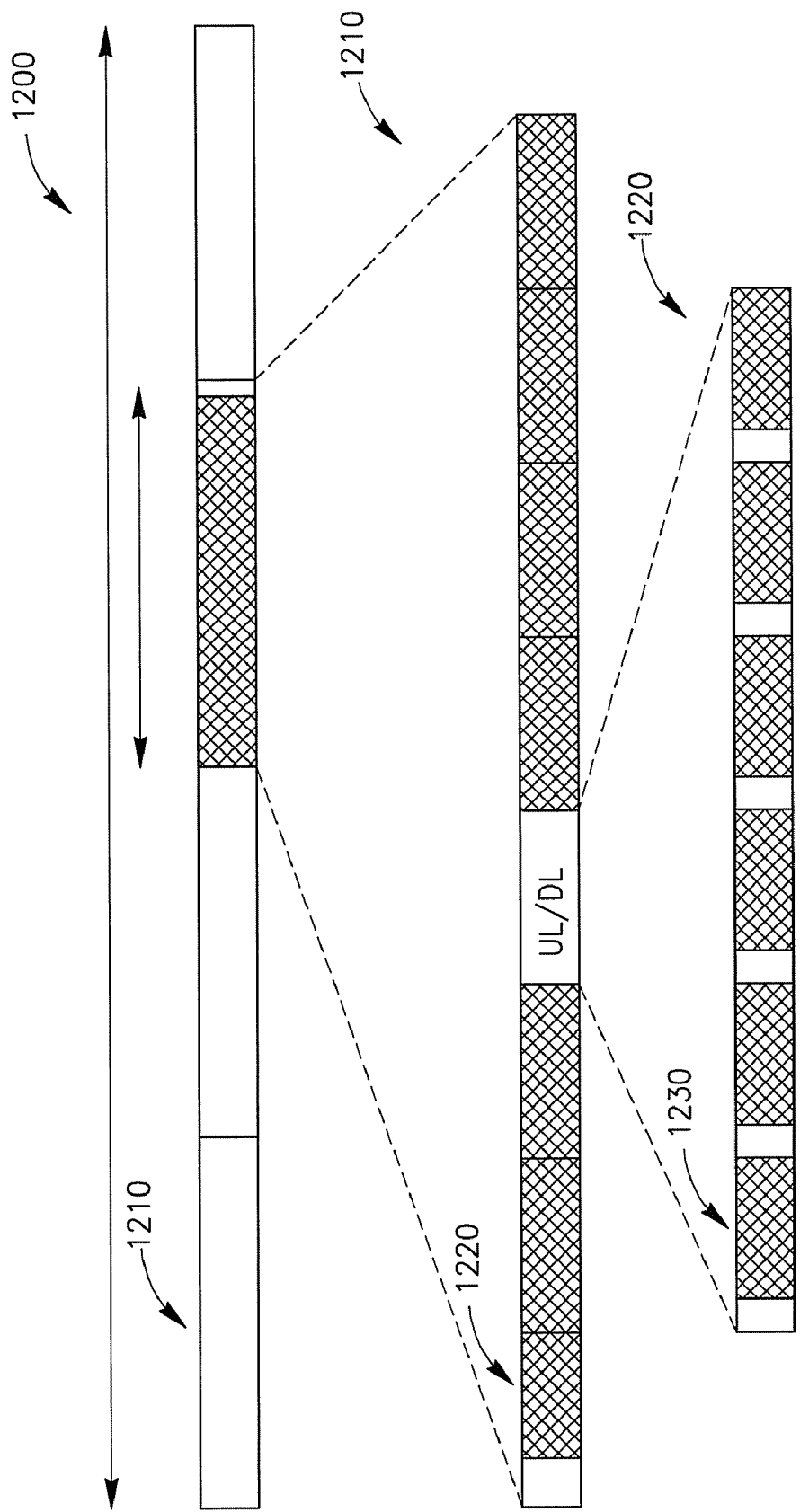
Figure 13:
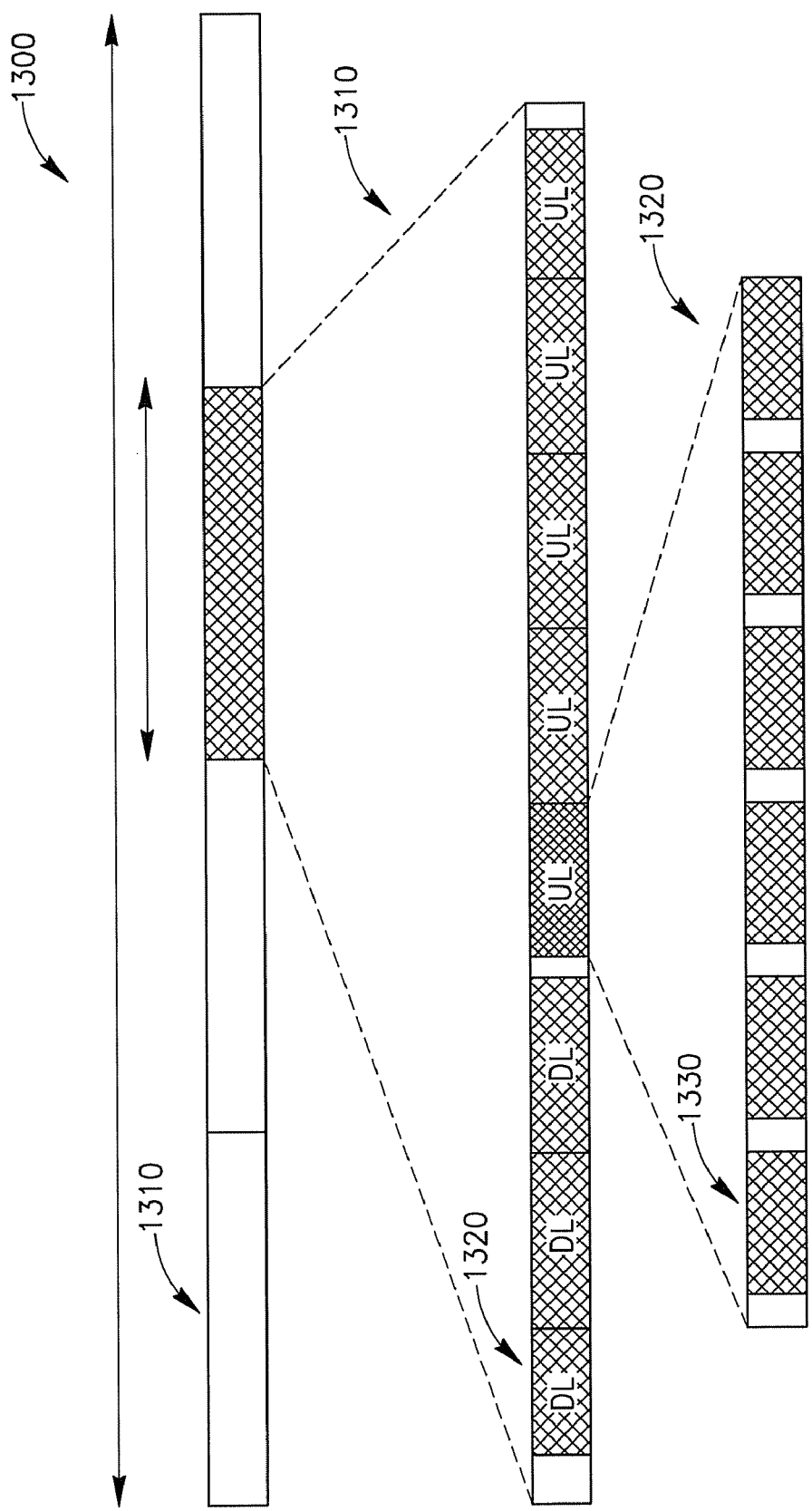
Figure 14:
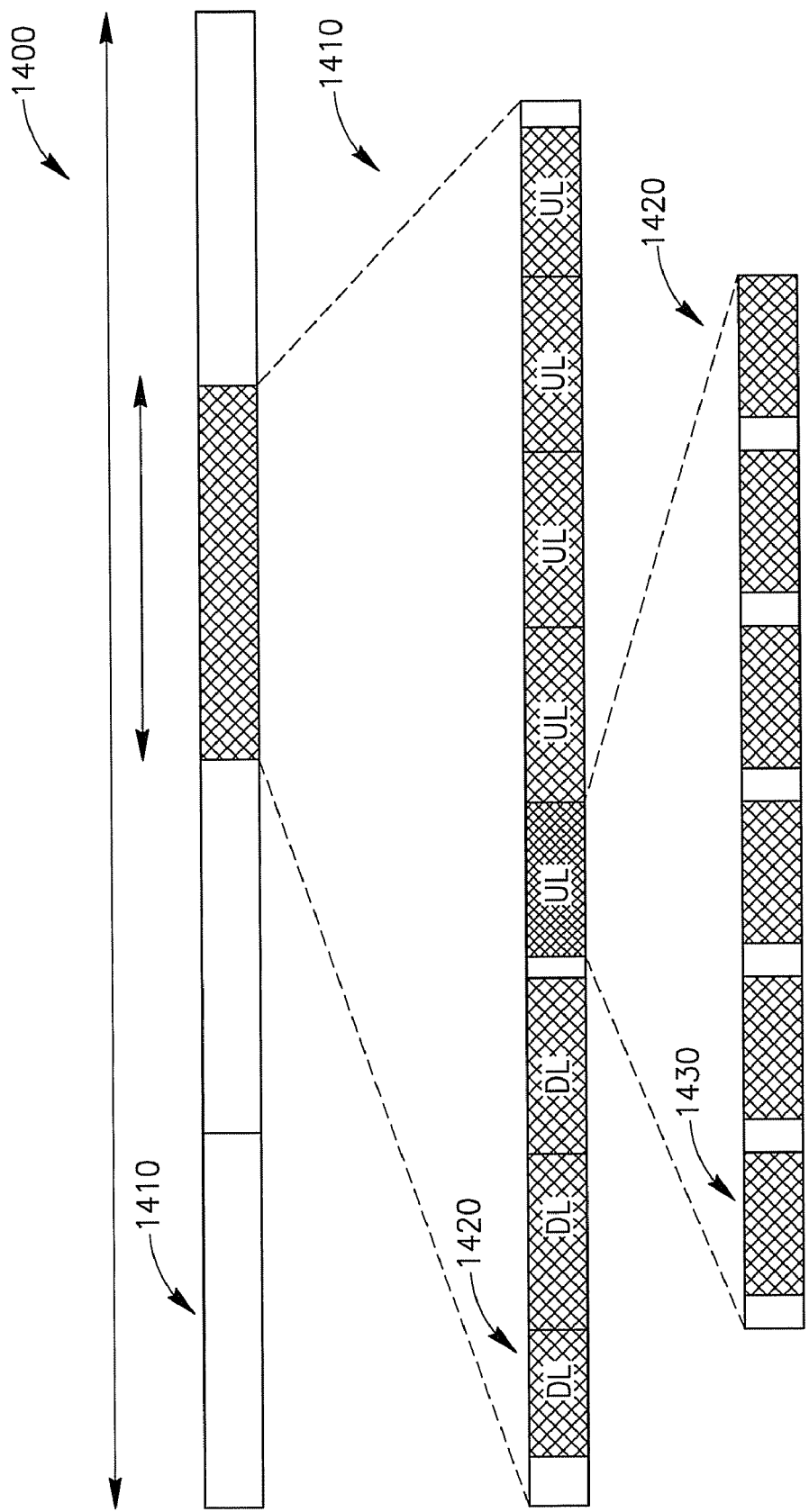
Figure 15:
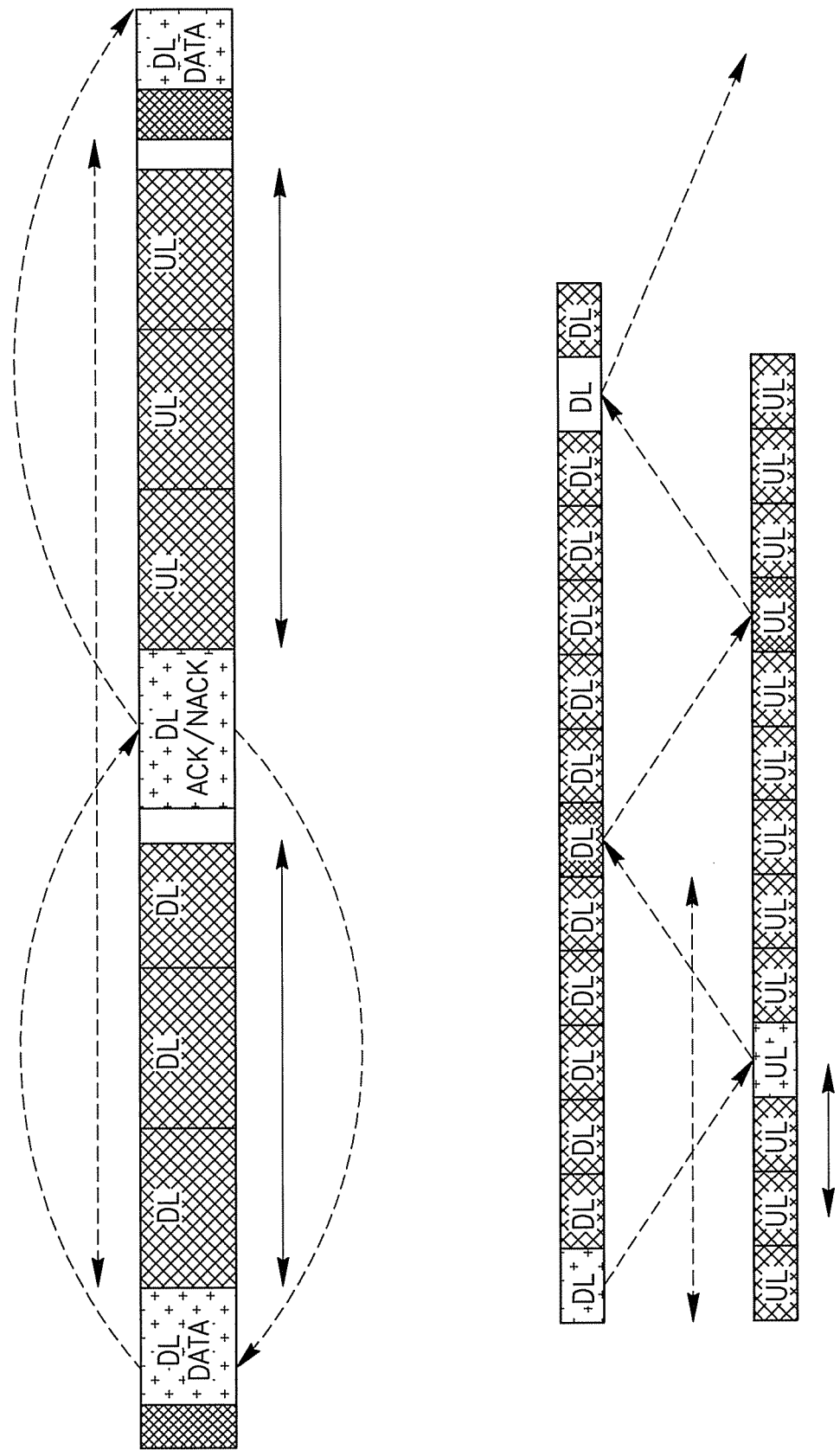
FIGS. 15-18 are schematic illustrations of fast feedback mechanisms according to embodiments of the present invention.
Figure 16:
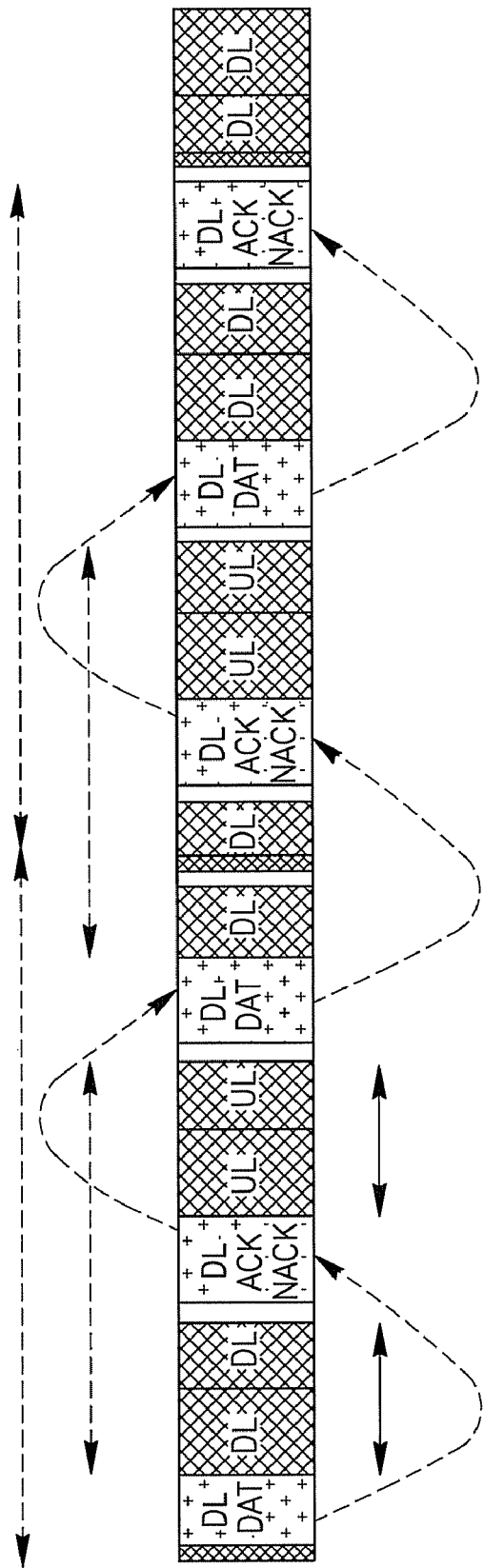

Reference is made to FIGS. 11-14, which schematically illustrate super-frames 1100, 1200, 1300, and 1400 and their respective frames, 1110, 1210, 1310, and 1410, each having substantially different cyclic prefixes and duplex modes according to various embodiments of the present invention. In FIG. 11, frame 1110 may be used in an FDD duplex mode and may have a cyclic prefix of ⅛ of (e.g., useful) OFDM symbol length. In FIG. 12, frame 1210 may be used in an FDD duplex mode and may have a cyclic prefix of ¹⁄₁₆ of (e.g., useful) OFDM symbol length. In FIG. 13, frame 1310 may be used in a TDD duplex mode and may have a cyclic prefix of ⅛ of (e.g., useful) OFDM symbol length. In FIG. 14, frame 1410 may be used in a TDD duplex mode and may have a cyclic prefix of ¹⁄₁₆ of (e.g., useful) OFDM symbol length. The number of OFDM symbols in a sub-frame may be related to, for example, the length of each OFDM symbol and/or the cyclic prefix value. Embodiments of the invention may be used having any suitable OFDM numerology. It may be appreciated by those skilled in the art that although a variety of parameters (e.g., duplex modes, cyclic prefix values, OFDM numerologies, etc.) may be used according to embodiments described herein, suitable variations may be used, for example, as depicted in the variations of FIGS. 11-14.

Embodiments of the invention may include a fast feedback mechanism. The fast feedback mechanism may include a reduced TTI length. A TTI length according to one embodiment of the invention may be equivalent to, for example, the length of one sub-frame. Thus, when a cyclic prefix (CP) is equal to, for example, ⅛ (e.g., useful) OFDM symbol length, the TTI may be approximately equal to, for example, to 0.617 ms. In some embodiments, the RTT may be approximately equal to, for example, 6 TTI, which according to the example given, may be approximately equal to, for example, 3.7 ms. RTT values described herein and depicted in FIGS. 11-14, may be substantially smaller than conventional RTTs, for example, obtained based on the current mobile WiMAX systems, and may thus, support higher mobility terminals or applications using lower latency and/or faster transmission at the physical layer. In one embodiment, sub-frames described herein may be demodulated and/or decoded, for example, in intervals of time, approximately less than or equal to, for example, 2 TTI intervals (e.g., approximately 1.23 ms).

Reference is made to FIGS. 15-18, which schematically illustrate fast feedback mechanisms according to embodiments of the invention. In one embodiment, fast feedback mechanisms may include frame structures that support fast turn around times, for example, for supporting higher mobility and lower link access latency. The fast feedback mechanisms may include acknowledgement (ACK) or negative acknowledgement (NACK) transmission.

Embodiment of the invention may provide fast feedback mechanisms for improved and efficient link adaptation, faster channel quality indication (CQI) transmission, and/or ACK/NACK signals for hybrid automatic repeat-request (H-ARQ) mechanisms for supporting mobile stations moving at substantially higher speeds. Current mobile WiMAX systems typically support transmissions to and/or from mobile terminals having speeds of, for example, approximately 120 km/h. Although embodiment of the invention depicted in FIGS. 15-18 may be used in a TDD duplex mode, it may be appreciated by those skilled in the art that an FDD duplex mode may also be used. In some embodiments, mechanisms described herein, for example, including the new frame structure and fast feedback mechanisms may support higher mobility and/or faster feedback rates when used in the FDD duplex mode relative to when are used in the TDD duplex mode.

Figure 17:
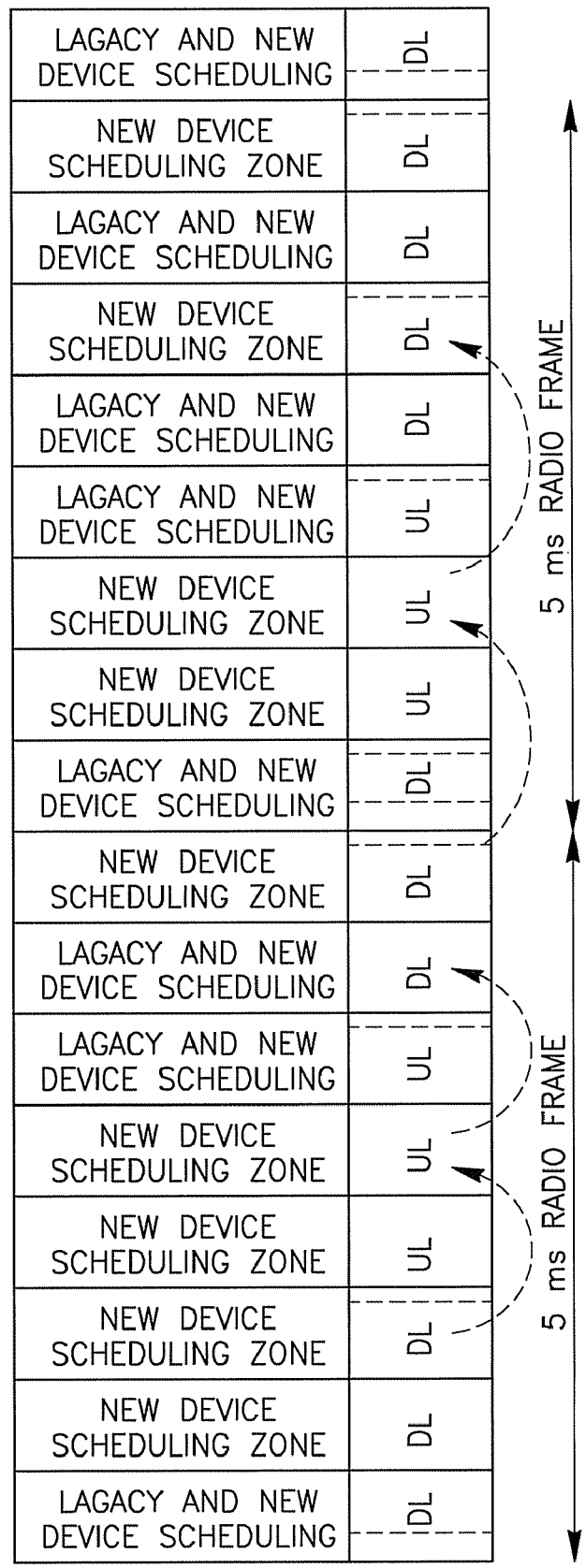

FIG. 17 illustrates an example of transmissions scheduled for new and legacy devices or terminals, for example, using new and legacy zones, according to an embodiment of the invention. In some embodiments, new base stations may support a combination or coexistence of legacy and new terminals in a network, for example, using embodiments of the frame structure described herein. In one embodiment, a fast feedback mechanism according to embodiments described herein, for example, may be used for supporting terminals (e.g., new and/or legacy terminals) having high mobility.

FIG. 18 illustrates an example of physical assignments on a sub-frame scale of resource, such as, legacy preamble (e.g., PSCH), supplemental preamble (e.g., SSCH), and broadcast channel (e.g., BCH), for example, using frame structures in a TDD duplex mode according to an embodiment of the invention. FIG. 18 illustrates an example of the ordering or allocation of sub-frame resources for communicating with new terminals (e.g., using new zone and/or legacy zone transmissions) and/or legacy terminals (e.g., using legacy zone transmissions). For example, the new zones may be transmitted in TDD duplex mode having cyclic prefix equal to ⅛ of the (e.g., one measure of useful) OFDM symbol length. Other proportions may be used.

Embodiments of the present invention may provide frame structures, for example, for supporting the current and the next or future generation mobile WiMAX systems. It may be appreciated by those skilled in the art that each of the non-limiting examples for the structure of frames, including for example, options I, II, and III, may be used in accordance with embodiments of super-frames, frames, sub-frames, new and legacy zones, fast feedback mechanisms, and/or other mechanisms, structures timing and/or frequency schemes described herein.

Compared with conventional systems, embodiments of the frame structure described herein may provide a more robust DL synchronization mechanism, more efficient broadcast channel transmissions, and/or lower transmission latency to enable of higher mobility, higher capacity and improved quality of service (QoS) while maintaining backward compatibility with existing mobile WiMAX systems. In some embodiments, the new frame structure may be transparent to the legacy terminals for seamless integration and/or upgrades into conventional networks or systems (e.g., from IEEE 802.16e-2005 systems to IEEE 802.16m systems).

Reference is made to FIGS. 19-23, which schematically illustrate frame structures adapted for coexisting with other wireless systems according to embodiments of the present invention. Conventional wireless systems or networks may include, for example, radio access technology networks, 3GPP LTE networks, time division-synchronous code division multiple access (TD-SCDMA) networks, mobile WiMAX networks, IEEE 802.16 networks, and/or other networks.

Figure 19:
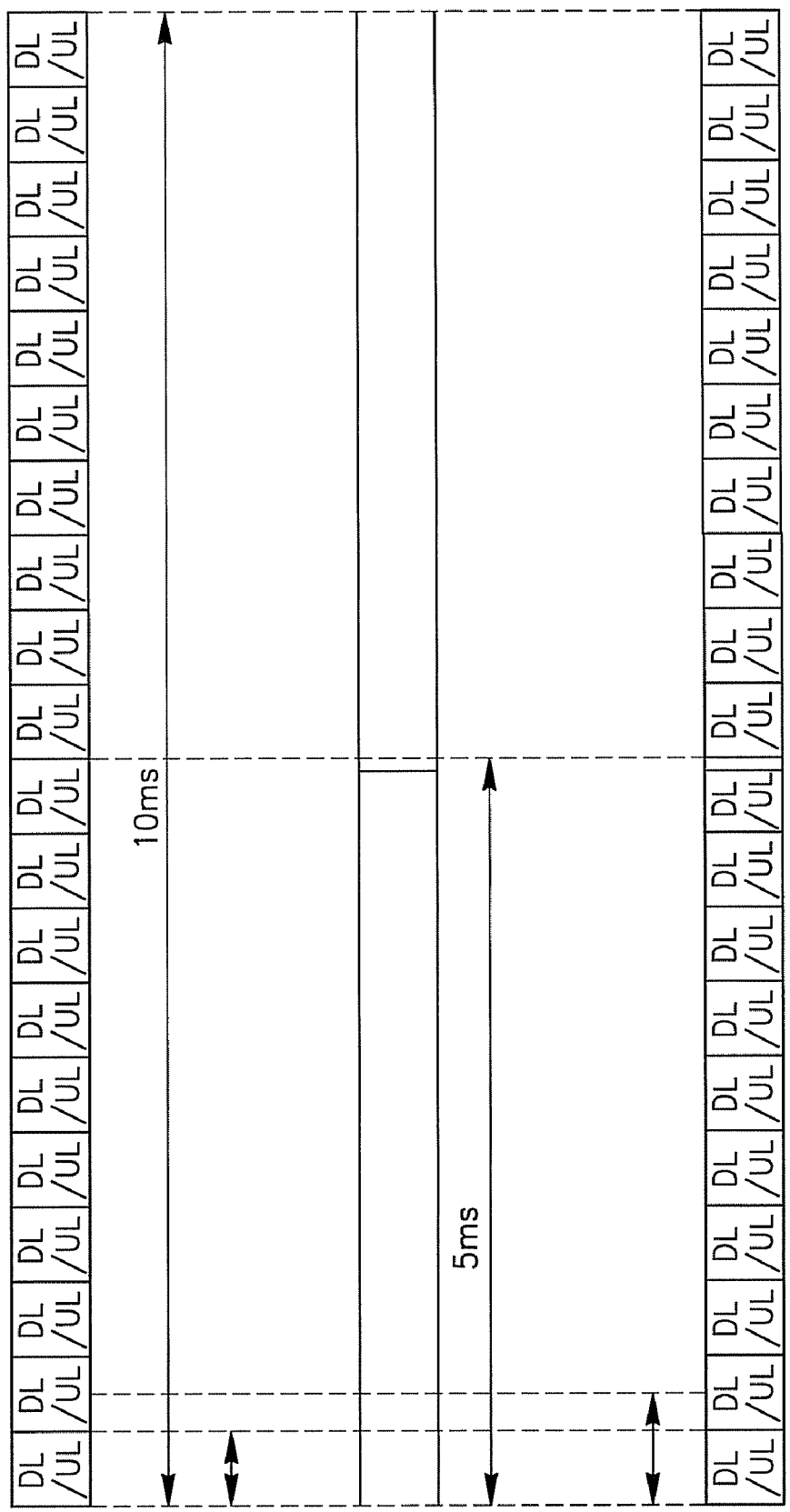
FIGS. 19-23 are schematic illustrations of frame structures adapted for coexisting with other wireless systems according to embodiments of the present invention.
Figure 20:
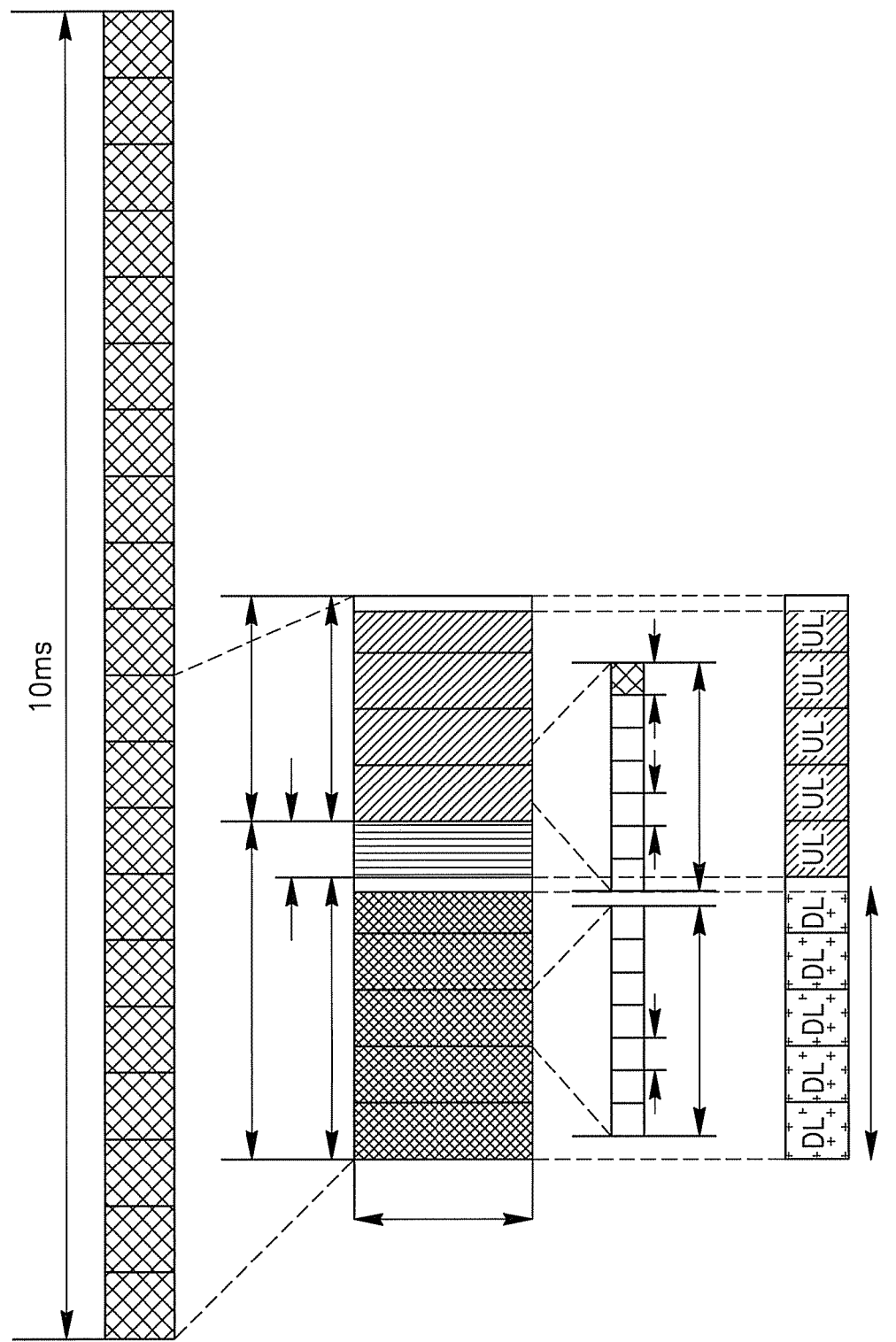
Figure 21:
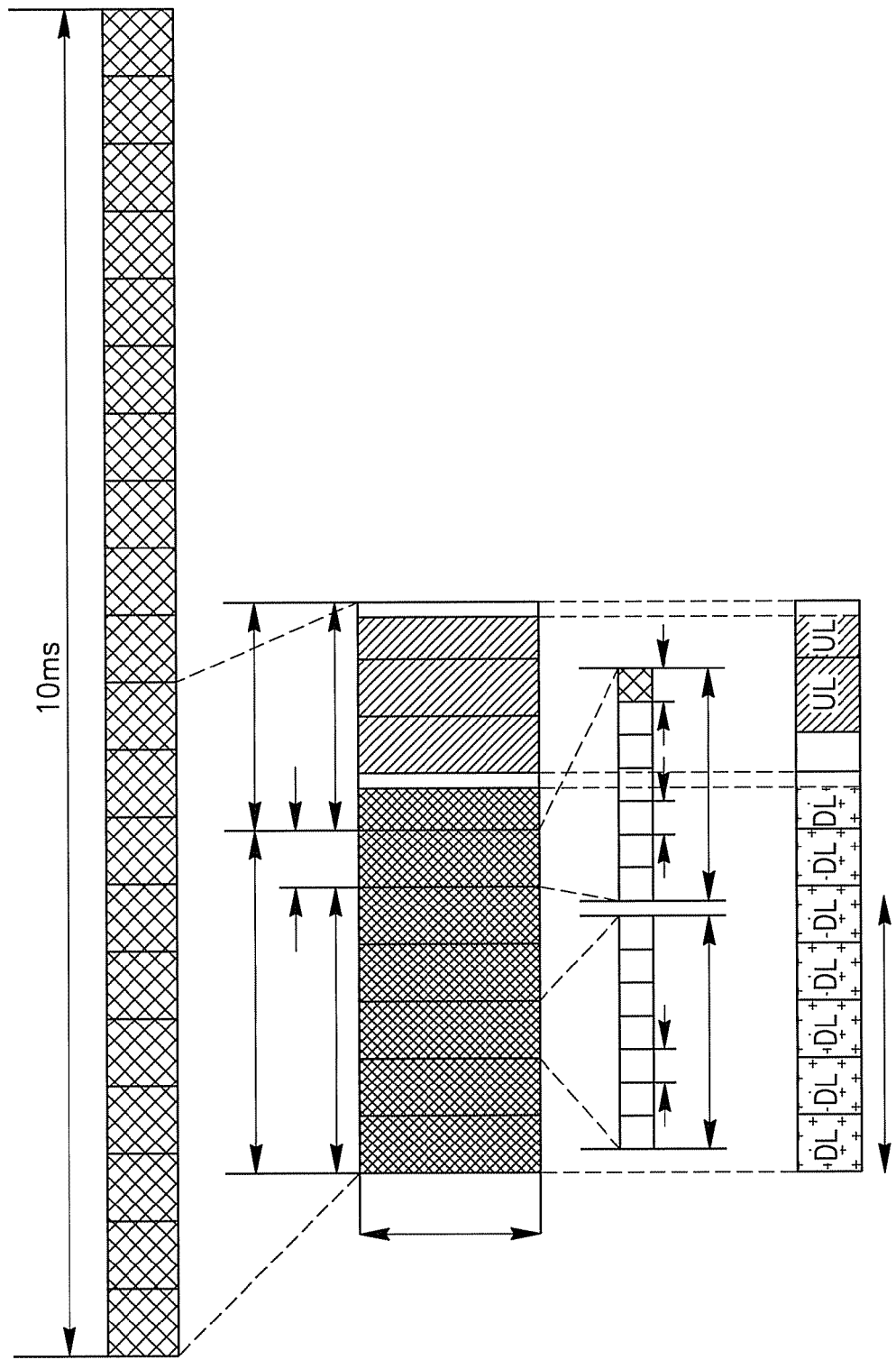
Figure 22:
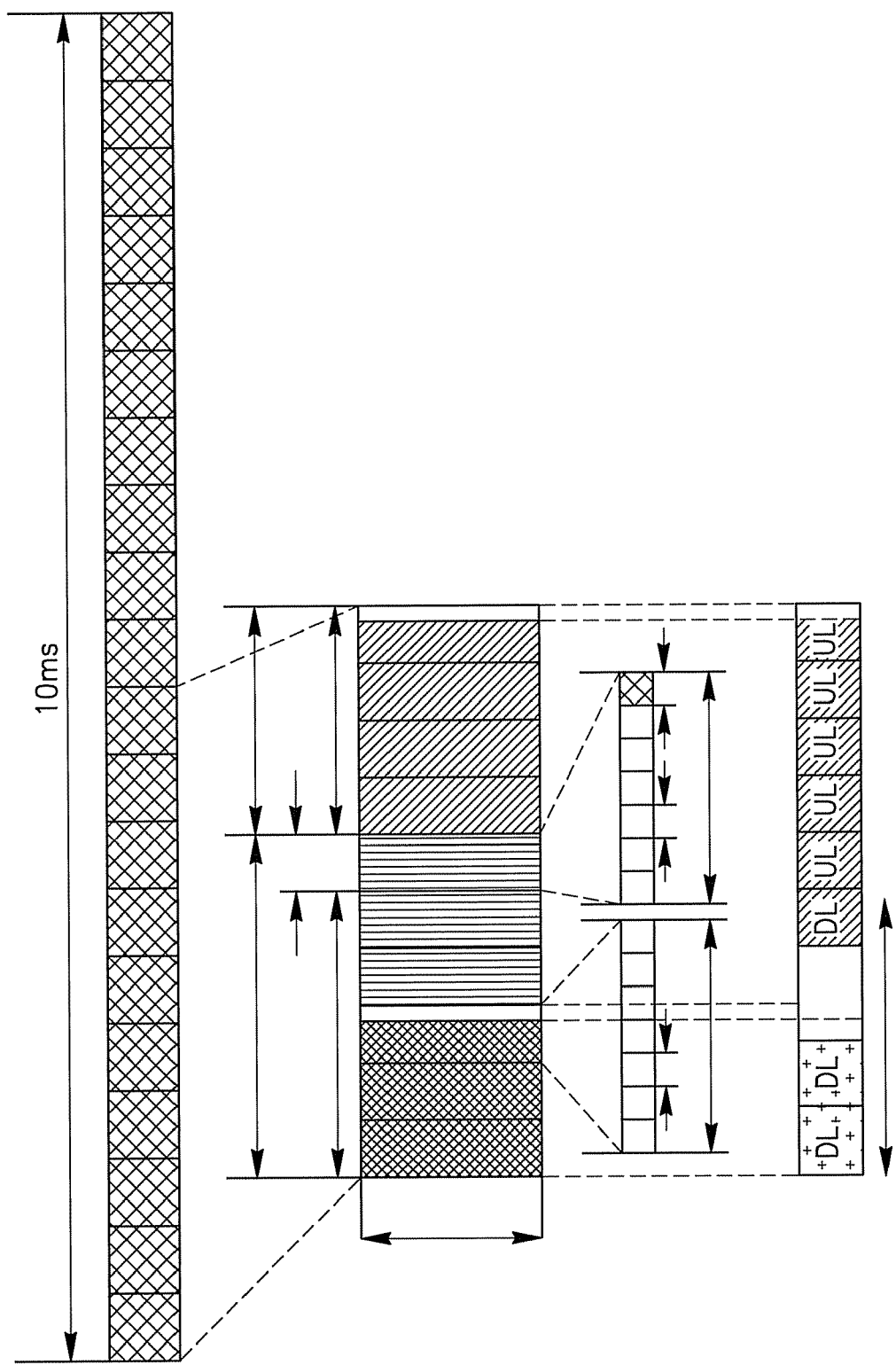
Figure 23:
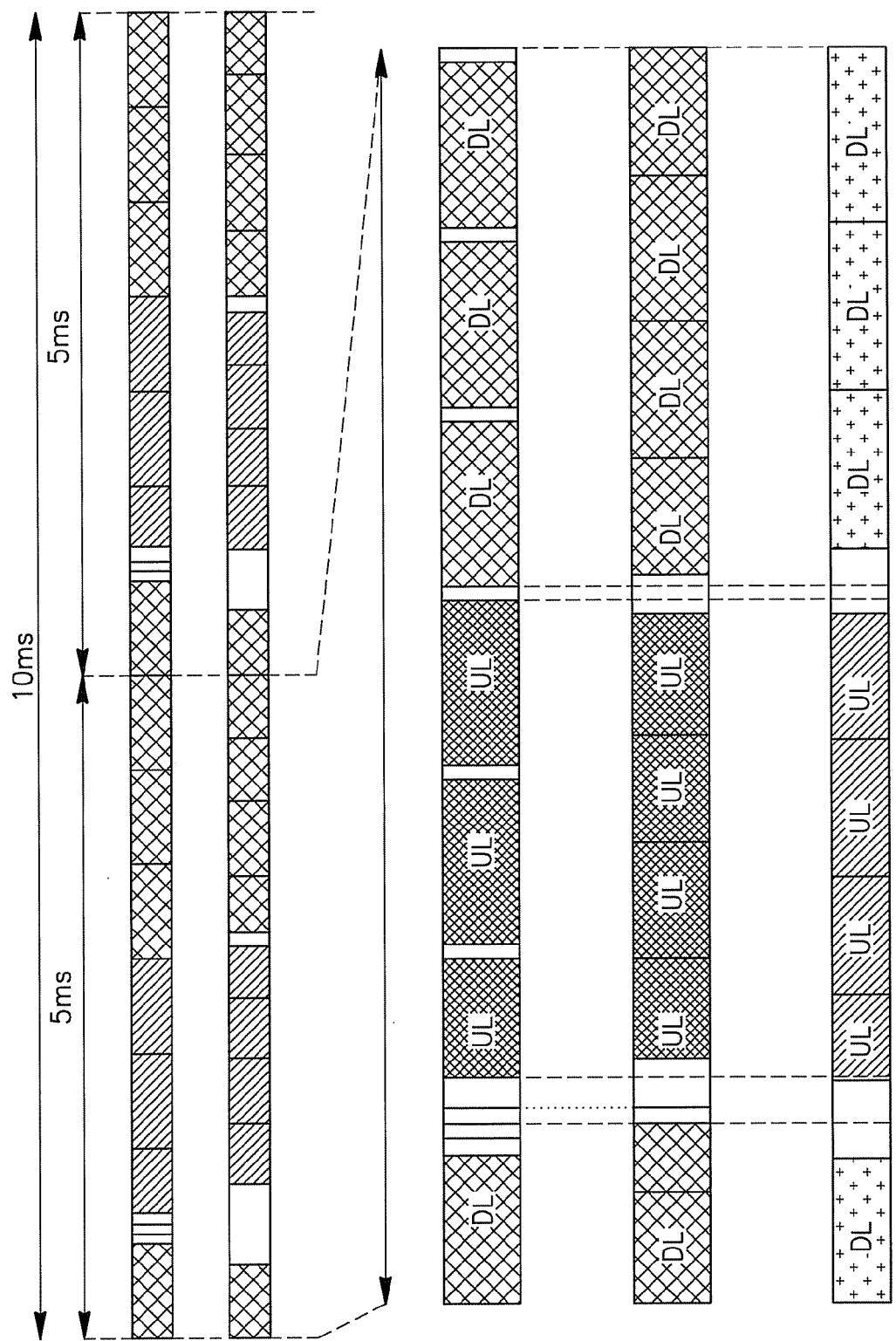

For example, FIG. 19 includes frame structures adapted for coexisting with 3GPP LTE systems, for example, in FDD duplex mode. FIG. 20 includes frame structures adapted for coexisting with 3GPP LTE systems, for example, in TDD duplex mode (e.g., where LTE DL:UL=5:5 and/or new mobile WiMAX system DL:UL=4:4). FIG. 21 includes frame structures adapted for coexisting with 3GPP LTE systems, for example, in TDD duplex mode (e.g., where LTE DL:UL=7:3 and/or new mobile WiMAX system DL:UL=6:2). FIG. 22 includes frame structures adapted for coexisting with 3GPP LTE systems, for example, in TDD duplex mode (e.g., where LTE DL:UL=3:7 and/or new mobile WiMAX system DL:UL=3:5). FIG. 23 includes frame structures adapted for coexisting with UTRA LCR-TDD TD-SCDMA systems.

Figure 24:
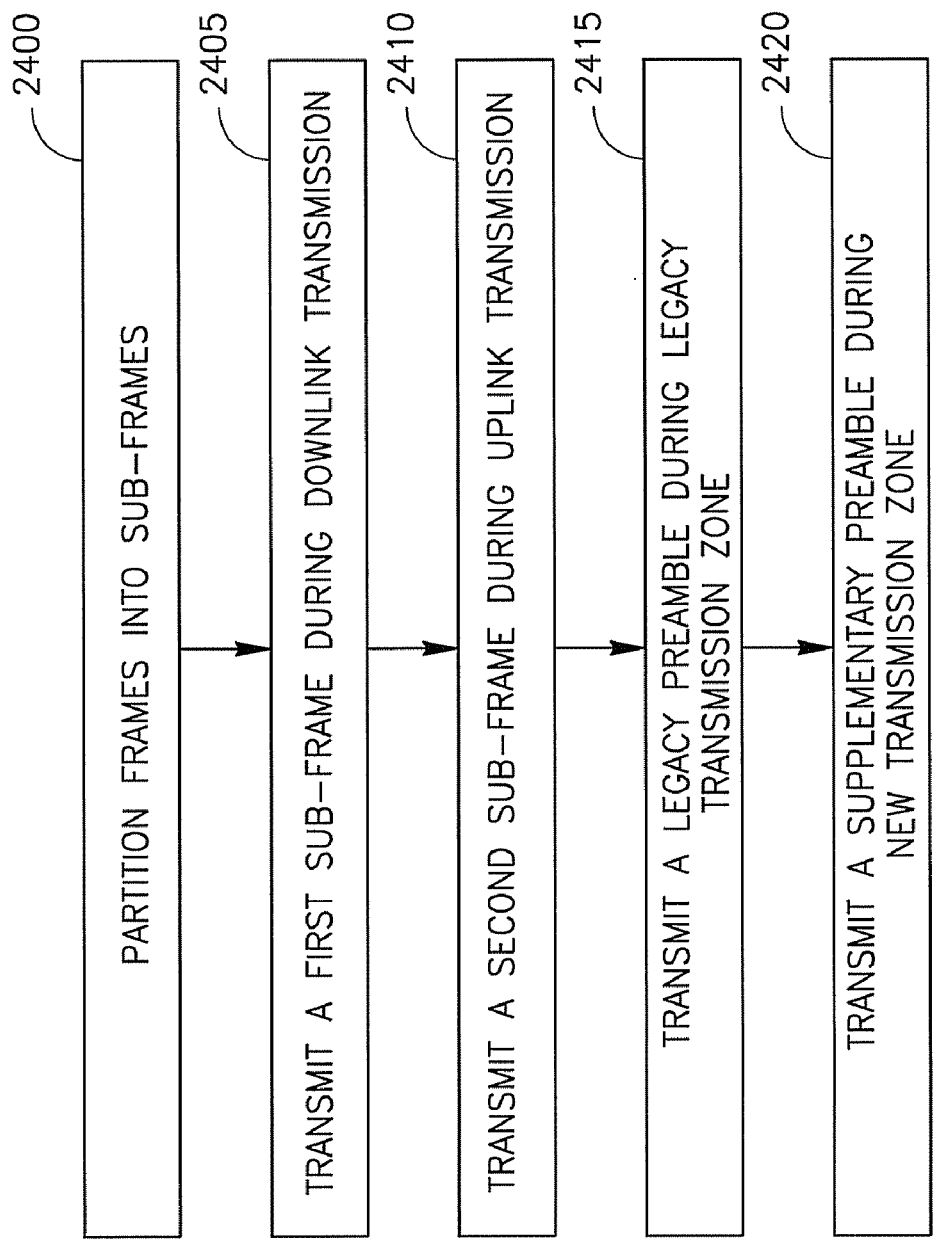
FIG. 24 is a flow chart of a method according to an embodiment of the present invention.

Reference is made to FIG. 24, which is a flow chart of a method according to an embodiment of the present invention.

In operation 2400, a processor in a terminal may partition each frame into two or more sub-frames. The frames (e.g., frames 410 described in reference to FIG. 4, or other frames) may be backward compatible with a reference system profile and for example, defined according to a reference standard system (e.g., IEEE 802.16e-2005 standard or mobile WiMAX profiles). Thus, as compared with the frames from which sub-frames are partitioned, the sub-frames (e.g., sub-frames 420 described in reference to FIG. 4) may be shorter and therefore processed and transmitted/received faster with smaller periodicity. Transmitting according to the sub-frame structure may provide over the air communications having a periodicity on the scale of several sub-frames instead of the relatively longer periodicity of several frames.

In some embodiments, the partitioned sub-frames may have a length selected for achieving a turn-around time for transmitting the sub-frames that is below a predetermined target threshold or value. The predetermined target threshold or value may be selected, set or determined by or according to, for example, a user, a system, a network, a standard specification, and/or other methods.

In operation 2405, a transmitter may transmit one or more sub-frames during a pre-designated downlink transmission (e.g., pre-designated DL transmissions 306, described in reference to FIG. 3).

In operation 2410, the transmitter may transmit one or more sub-frames during a pre-designated uplink transmission (e.g., pre-designated UL transmissions 308, described in reference to FIG. 3)

In operation 2415, the transmitter may transmit one of the plurality of sub-frames including a legacy preamble for communicating with a legacy terminal, for example, operating according to the reference system profile during a pre-designated legacy transmission period or zone (e.g., legacy zone 612 and/or 616, described in reference to FIG. 6).

In operation 2420, the transmitter may transmit one of the plurality of sub-frames including a supplemental preamble for communicating with a new (e.g., a non-legacy) terminal, for example, operating according to an evolved or newer version of the reference system standard, such as, the IEEE 802.16m standard, during a pre-designated new (e.g., a non-legacy) transmission period or zone (e.g., new zone 614 and/or 618, described in reference to FIG. 6).

In various embodiments, the first and second signals may be transmitted in a TDD duplex mode or an FDD duplex mode. In some embodiments, when the signals are transmitted in a TDD duplex mode, operations 2405 and 2410 may be executed over substantially different time intervals, or frame positions, such that the first and second signals may be transmitted separately. In other embodiments, when the when the signals are transmitted in an FDD duplex mode, operations 2405 and 2410 may be executed in substantially overlapping time periods, such that the first and second signals may be transmitted over substantially distinct frequencies and/or channels.

In some embodiments, the sub-frames may be further partitioned into two or more (e.g., six (6)) information-carrying, multiplexing, and/or OFDM symbols.

In some embodiments, the first and second signals may include a legacy preamble for communicating with legacy terminals operating according to the reference system profile and a supplementary preamble for communicating with a new (e.g., a non-legacy) terminal operating according to a second system standard and/or an evolved version of the reference system. In one embodiment, each of the first and second sub-frames may be pre-designated for communicating with one of a legacy terminal, a non-legacy terminal, or both a legacy and non-legacy terminal. For example, one of two or more sub-frames in operation 2410 may be pre-designated for communicating with both a legacy and a non-legacy terminal.

In some embodiments, the beginning of the frames, which may be pre-designated for communicating with legacy terminals and non-legacy terminals, may be offset, for example, by a fixed number of sub-frames.

In some embodiments, a super-frame may be defined. For example, the super-frame may include two or more frames (e.g., the frames described in operation 2400) that may be transmitted in succession. In one embodiment, the supplementary preamble may be transmitted substantially once during the transmission of each super-frame. In one embodiment, the supplementary preamble may be transmitted substantially once every frame.

According to embodiments such as that of Option I described herein, the legacy preamble and the supplementary preamble may be transmitted separately, for example, at a substantially fixed distance apart along the length of the frame.

In one embodiment, a process may execute operations 2400, 2405, and 2410 and need not execute operations 2415 and 2420. In another embodiment, a process may execute operations 2400, 2415, and 2420 and need not execute operations 2405 and 2410. In yet another embodiment, a process may execute operations 2400, 2405, 2410, 2415, and 2420. The process may execute other sequences, orders, and/or permutations of operations described herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

The invention claimed is:
1. A method comprising:
   processing a super-frame structure including a sequence of super frames, wherein each super frame of the super frames includes a sequence of a first predefined integer number of frames for communication in a wireless communications network according to a reference system standard, wherein each frame of the sequence of frames includes a second predefined integer number of sub-frames, wherein each sub-frame includes a third predefined integer number of orthogonal-frequency-division-multiplexing (OFDM) symbols, wherein the super frame includes at least one legacy zone allocated for communication with at least a legacy terminal according to the reference system standard and at least one non-legacy zone for communication with a non-legacy terminal, wherein a beginning of each zone of the legacy and non-legacy zones is aligned with a beginning of a respective one of the sub-frames;
during the legacy zone, transmitting one of the plurality of sub-frames including a legacy preamble for communicating with the legacy terminal, wherein the legacy preamble is transmitted once during the transmission of each of the frames; and
during the non-legacy zone, transmitting one of the plurality of sub-frames including a non-legacy preamble for communicating with the non-legacy terminal and one or more of the plurality of sub-frames including data to be received by the non-legacy terminal, wherein the non-legacy preamble is transmitted substantially once within each super-frame,
wherein a legacy transmission time interval of the communication with the legacy terminal corresponds to a length of a frame within the super frame,
and wherein a non-legacy transmission time interval of the communication with the non-legacy terminal corresponds to a length of a sub-frame within the frame.

2. The method of claim 1, wherein the sub-frames have a length selected for achieving a turn-around time for transmitting the sub-frames that is below a turn-around time for communicating with the legacy terminal.

3. The method of claim 1, wherein the first number is equal to or greater than four, and the second number is equal to or greater than eight.

4. The method of claim 1, wherein the third number is equal to or greater than six (6).

5. The method of claim 1, wherein at least one of the transmitting during the legacy zone and transmitting during the non-legacy zone includes using a time division duplex mode for transmitting downlink and uplink transmissions.

6. The method of claim 1, wherein at least one of the transmitting during the legacy zone and transmitting during the non-legacy zone includes using a frequency division duplex mode for transmitting signals in sub-frames over substantially different frequencies.

7. The method of claim 1 comprising:
transmitting to the legacy terminal a legacy downlink transmission during a downlink zone within the legacy zone and a legacy uplink transmission during an uplink zone within the legacy zone; and
transmitting to the non-legacy terminal a non-legacy downlink transmission during a downlink zone within the non-legacy zone and an uplink transmission during an uplink zone period within the non-legacy zone.

8. The method of claim 1, wherein the transmitting during the legacy zone includes transmitting one or more of the plurality of sub-frames including data to be received by the non-legacy terminal.

9. The method of claim 1, wherein the transmitting during the legacy zone and the transmitting during the non-legacy zone include transmitting a legacy frame and transmitting a non-legacy frame, respectively, and wherein the legacy and the non-legacy frames are offset by a fixed number of sub-frames.

10. The method of claim 1 comprising transmitting the legacy preamble and the non-legacy preamble substantially a fixed distance apart along the length of the super-frame.

11. The method of claim 1 comprising:
transmitting one or more of the plurality of sub-frames for a non-relay transmission including transmitting a (DL: BS→MS/RS) sub-frame during a pre-designated downlink transmission and a (UL:MS/RS→BS) sub-frame during a pre-designated uplink transmission; and
transmitting one or more of the plurality of sub-frames for a relay transmission including transmitting a (DL: RS→MS) sub-frame during a pre-designated downlink transmission and a (UL:MS→RS) sub-frame during a pre-designated uplink transmission.

12. The method of claim 11, further comprising supporting a two-hop relay transmission.

13. The method of claim 12, further comprising supporting a two-hop relay with optimized latency.

14. The method of claim 11, further comprising partitioning even-numbered hop zones into (DL: BS→MS, BS→odd RS, even RS→odd RS) zones during a pre-designated downlink transmission and (UL: MS→BS, odd RS→BS, odd RS→even RS) during a pre-designated uplink transmission and odd-numbered hop zone into (DL: odd RS→even RS, odd RS→MS) zones during a pre-designated downlink transmission and (UL: MS→odd RS, even RS→odd RS) during a pre-designated uplink transmission.

15. The method of claim 14, further comprising transmitting using a multi-hop relay transmission.

16. The method of claim 11, further comprising using a transparent relay, where the RS does not transmit a preamble, a broadcast channel, and a control channel.

17. The method of claim 11, further comprising using a non-transparent relay, where the RS transmits a preamble, a broadcast channel, and a control channel.

18. A system comprising:
a processor to process a super-frame structure including a sequence of super frames, wherein each super frame of the super frames includes a sequence of a first predefined integer number of frames for communication in a wireless communications network according to a reference system standard, wherein each frame of the sequence of frames includes a second predefined integer number of sub-frames, wherein each sub-frame includes a third predefined integer number of orthogonal-frequency-division-multiplexing (OFDM) symbols, wherein the super frame includes at least one legacy zone allocated for communication with at least a legacy terminal according to the reference system standard and at least one non-legacy zone for communication with a non-legacy terminal, wherein a beginning of each zone of the legacy and non-legacy zones is aligned with a beginning of a respective one of the sub-frames; and
a transmitter to transmit, during the legacy zone, one of the plurality of sub-frames including a legacy preamble for communicating with the legacy terminal, and to transmit, during the non-legacy zone, one of the plurality of sub-frames including a non-legacy preamble for communicating with the non-legacy terminal and one or more of the plurality of sub-frames including data to be received by the non-legacy terminal,
wherein the legacy preamble is transmitted once during the transmission of each of the frames,
wherein the non-legacy preamble is transmitted substantially once within each super-frame, wherein a legacy transmission time interval of the communication with the legacy terminal corresponds to a length of a frame within the super frame, and wherein a non-legacy transmission time interval of the communication with the non-legacy terminal corresponds to a length of a sub-frame within the frame.

19. The system of claim 18, wherein the first number is equal to or greater than four, and the second number is equal to or greater than eight.

20. The system of claim 18, wherein the transmitter is to transmit during the legacy zone one or more of the plurality of sub-frames including data to be received by the non-legacy terminal.

21. The system of claim 18, wherein the transmitter is to transmit a legacy frame during the legacy zone and a non-legacy frame during the non-legacy zone, wherein the legacy frame and the non-legacy frame are offset by a fixed number of sub-frames.

22. The system of claim 18, wherein the transmitter is to transmit the legacy preamble and the non-legacy preamble substantially a fixed distance apart along the length of the super-frame.

23. The system of claim 18, wherein the third number is equal to or greater than six (6).

24. The system of claim 18, wherein the sub-frames have a length selected for achieving a turn-around time for transmitting the sub-frames that is below a turn-around time for communicating with the legacy terminal.

* * * * *